April 1, 1941.   A. H. DICKINSON   2,237,136
MULTIPLYING MACHINE
Filed Sept. 21, 1937   15 Sheets-Sheet 1

INVENTOR
A. H. Dickinson
BY
ATTORNEY

April 1, 1941.  A. H. DICKINSON  2,237,136
MULTIPLYING MACHINE
Filed Sept. 21, 1937  15 Sheets-Sheet 2

INVENTOR
A. H. Dickinson
BY
ATTORNEY

April 1, 1941.  A. H. DICKINSON  2,237,136
MULTIPLYING MACHINE
Filed Sept. 21, 1937   15 Sheets-Sheet 3

INVENTOR
A. H. Dickinson
BY
W. M. Wilson
ATTORNEY

April 1, 1941.   A. H. DICKINSON   2,237,136
MULTIPLYING MACHINE
Filed Sept. 21, 1937   15 Sheets-Sheet 4

INVENTOR
A. H. Dickinson
BY
W. M. Wilson
ATTORNEY

April 1, 1941. A. H. DICKINSON 2,237,136
MULTIPLYING MACHINE
Filed Sept. 21, 1937 15 Sheets-Sheet 5

INVENTOR
A. H. Dickinson
BY
ATTORNEY

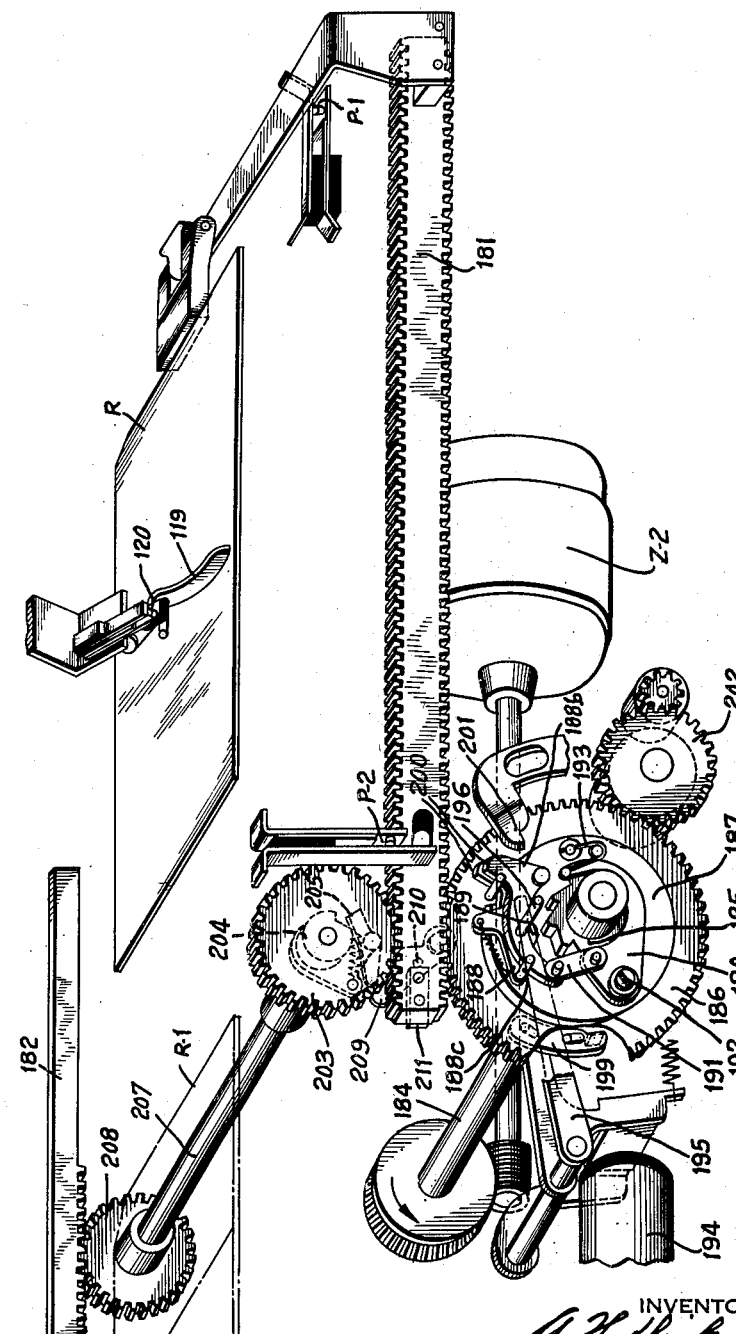

April 1, 1941. A. H. DICKINSON 2,237,136
MULTIPLYING MACHINE
Filed Sept. 21, 1937 15 Sheets-Sheet 7

April 1, 1941.  A. H. DICKINSON  2,237,136
MULTIPLYING MACHINE
Filed Sept. 21, 1937  15 Sheets-Sheet 12
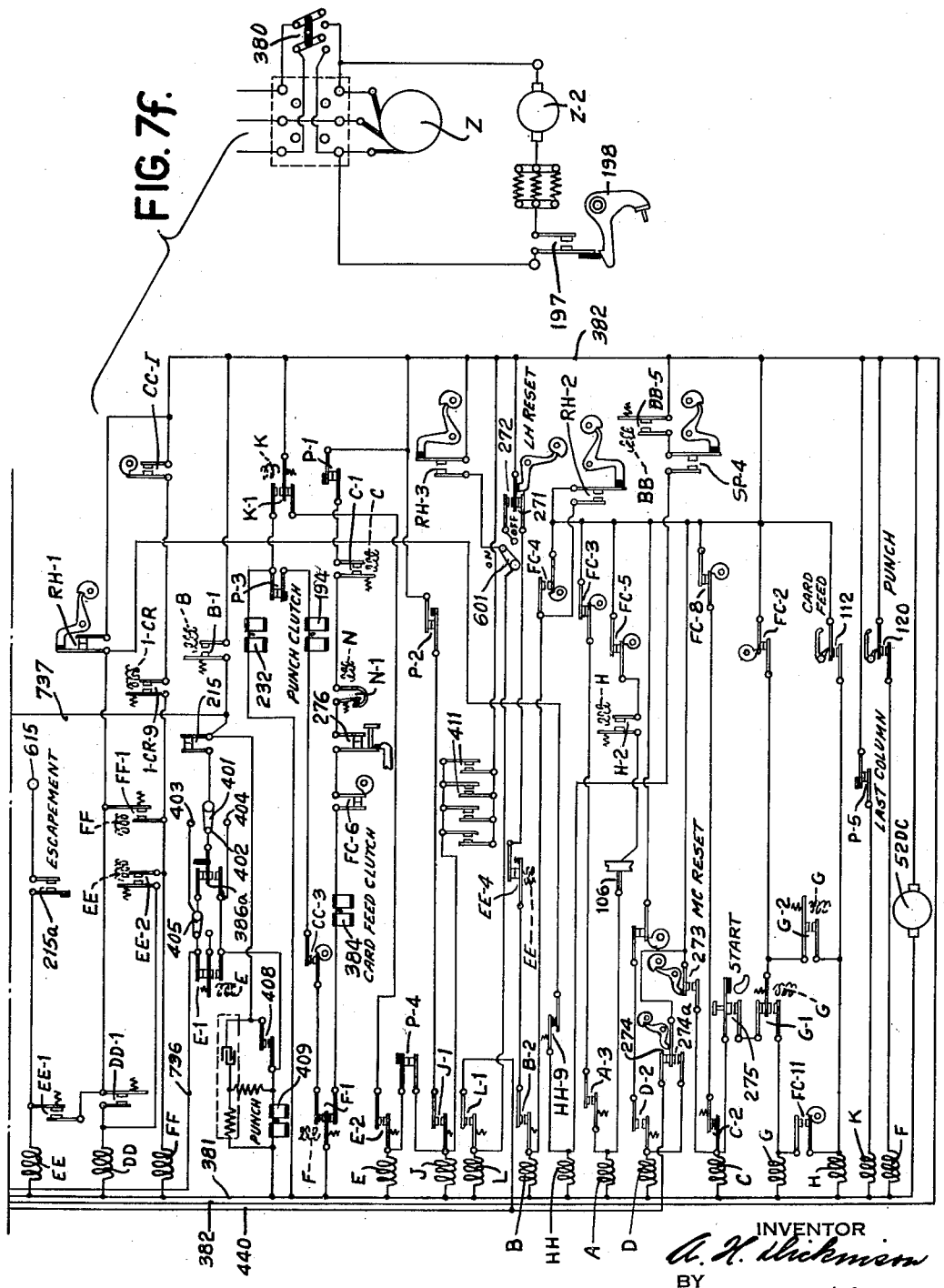
INVENTOR
A. H. Dickinson
BY
W. M. Wilson
ATTORNEY April 1, 1941.  A. H. DICKINSON  2,237,136
MULTIPLYING MACHINE
Filed Sept. 21, 1937   15 Sheets-Sheet 13

Patented Apr. 1, 1941

2,237,136

UNITED STATES PATENT OFFICE 2,237,136

MULTIPLYING MACHINE

Arthur H. Dickinson, Bronxville, N. Y., assignor to International Business Machines Corporation, New York, N. Y., a corporation of New York Application September 21, 1937, Serial No. 164,854

12 Claims. (Cl. 235—61.10)

This invention has for its general object the provision of improvements to record-controlled multiplying machines whereby a plurality of computations are effected during one run of a card through the machine.

Multiplying machines heretofore have been capable of handling split multiplication problems of the general form (A×B), (A₁×B₁) during one card run. Multiplying machines have also been provided whereby it is possible to obtain a product and use this product as a new multiplicand amount for multiplication by another multiplier amount during one card run.

An object of this invention is the provision of a multiplying machine capable of handling a single multiplicand amount and a plurality of multiplier amounts and of computing the several products of the multiplicand by each multiplier and of recording these products.

A further feature of the machine is the provision of means whereby a plurality of multiplier amounts are entered from a master card into the machine for the subsequent multiplication of each single multiplicand amount appearing on succeeding detail cards.

In this machine the several multiplier amounts are entered into a single entry receiving device. Each multiplier is used successively to multiply the single multiplicand amount.

It will be appreciated that each column of the several multiplier amounts bears a certain order designation such as units, tens, etc. When entry of these several multiplier amounts is made into a single entry receiving device, the order designations of the receiving device, the cycle controller and column shift circuits prevail over those of the individual multiplier amounts, unless special correlating circuits are provided. In multiplying machines heretofore provision is made for successively correlating the units' and tens' order of several multiplier amounts with the corresponding orders of the cycle controller and column shift circuits as computations with each multiplier amount occur so that products are formed in proper columnar relation in the products accumulators. Machines of the prior art just noted are limited in that the number of orders of each multiplier amount is limited to two.

Accordingly, it is an object of this invention to provide means whereby, when the orders of the several multiplier amounts differ in number, such orders are correlated with the corresponding orders of the cycle controller and column shift circuits as computations with each multiplier amount occur so that products are formed in proper columnar relation in the products accumulators.

Another object is the provision whereby, when orders of the several multiplier amounts differ in number irrespective of whether the multipliers are derived either from record cards or a hand setup device, such orders are correlated with the corresponding orders of the cycle controller and column shift circuits as computations with each multiplier amount occur so that products are formed in proper columnar relation in the products accumulators.

The general mode of operation of this invention is as follows: After the multiplicand and multiplier amounts have been derived from a record card the machine computes the product of the MC by one MP amount. Partial products are entered into the LH and RH accumulators. Following an RH to LH transfer the first product is formed and shortly thereafter punching of the first product in the record is initiated. Concurrently the machine computes the product of the MC by the second MP amount. This time, however, the partial products are entered into the SP and RH accumulators. When punching of the first and computing of the second products are completed and an RH to SP transfer is effected, punching of the second product and computing of the product of MC by the third MP start. Now the partial products are again entered into the LH and RH accumulators. When all of the products have been obtained and recorded the following card is fed and operations repeat.

It is accordingly an object of this invention to provide a multiplying machine whereby a plurality of product amounts may be formed successively and entered alternately into two product accumulators.

Another object of this invention is the provision whereby a number of product amounts are formed and entered into product accumulators, the latter being less in number than the number of products which may be obtained.

A further object is the provision of a multiplying machine wherein the recording of product amounts formed successively is controlled alternately from the accumulators receiving the product amounts.

Still another object is the provision of means whereby the same columns of two result accumulators receive results alternately and alternately control result recording, which results are recorded in a plurality of fields on a record card.

A still further object is the provision of means whereby a plurality of results are recorded on a record which results are formed alternately in the same elements of two accumulators.

Another object is the provision of means whereby a plurality of results are recorded on a record in succession under the control of alternate accumulators.

A further object is the provision of initiating means for recording a plurality of results, which initiating means is effective in its operation for a given result only after such result has been completely formed.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

In the drawings:

Figs. 1 and 1a, taken together, show a somewhat diagrammatic view of the various units of the machine and also the driving mechanism for the various units.

Figures 5, 6:
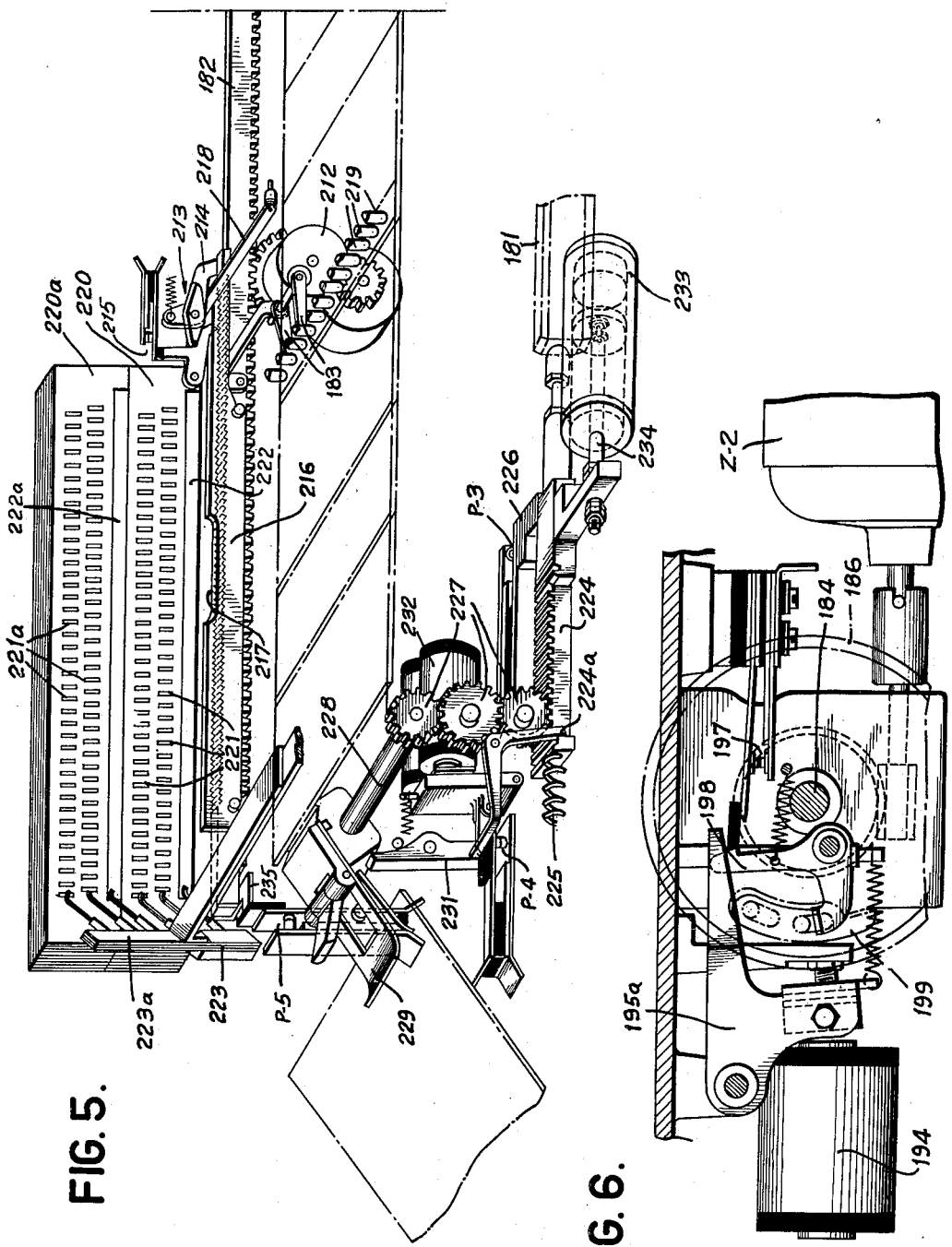

Figs. 5 and 5a, taken together, show a somewhat diagrammatic view of the punching section of the machine.

Fig. 6 is a sectional detail of certain parts in the punching section of the machine.

Figs. 7a, 7b, 7c, 7d, 7e, and 7f, taken together and arranged vertically in the order named, show the complete circuit diagram of the machine.

Figure 8:
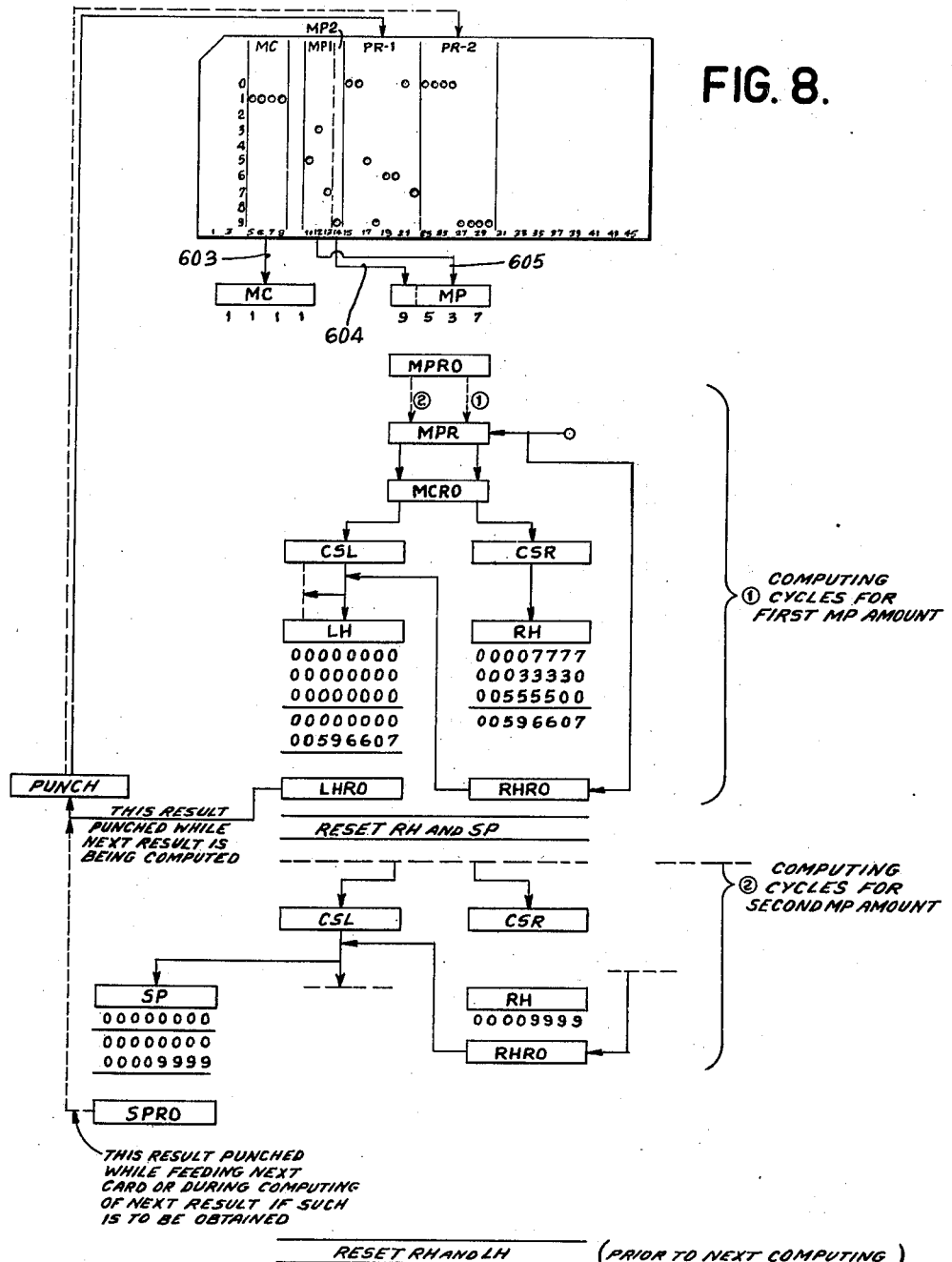

Fig. 8 is a diagrammatic view showing the sequence of operations.

Figure 8A:
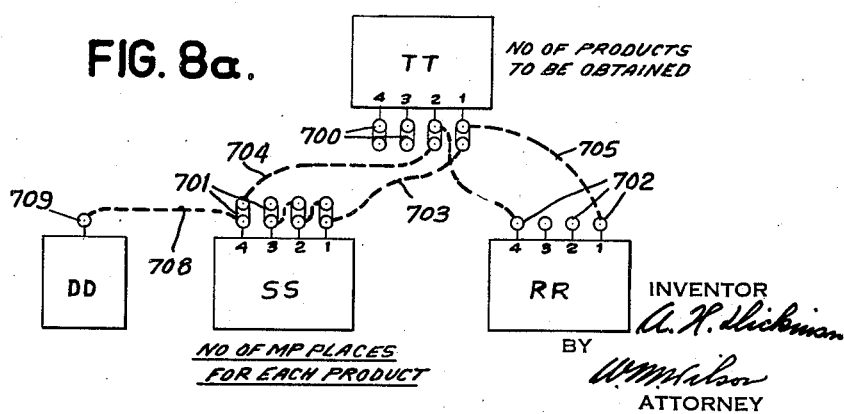

Fig. 8a is a detail showing certain plugging arrangements.

Figure 9:
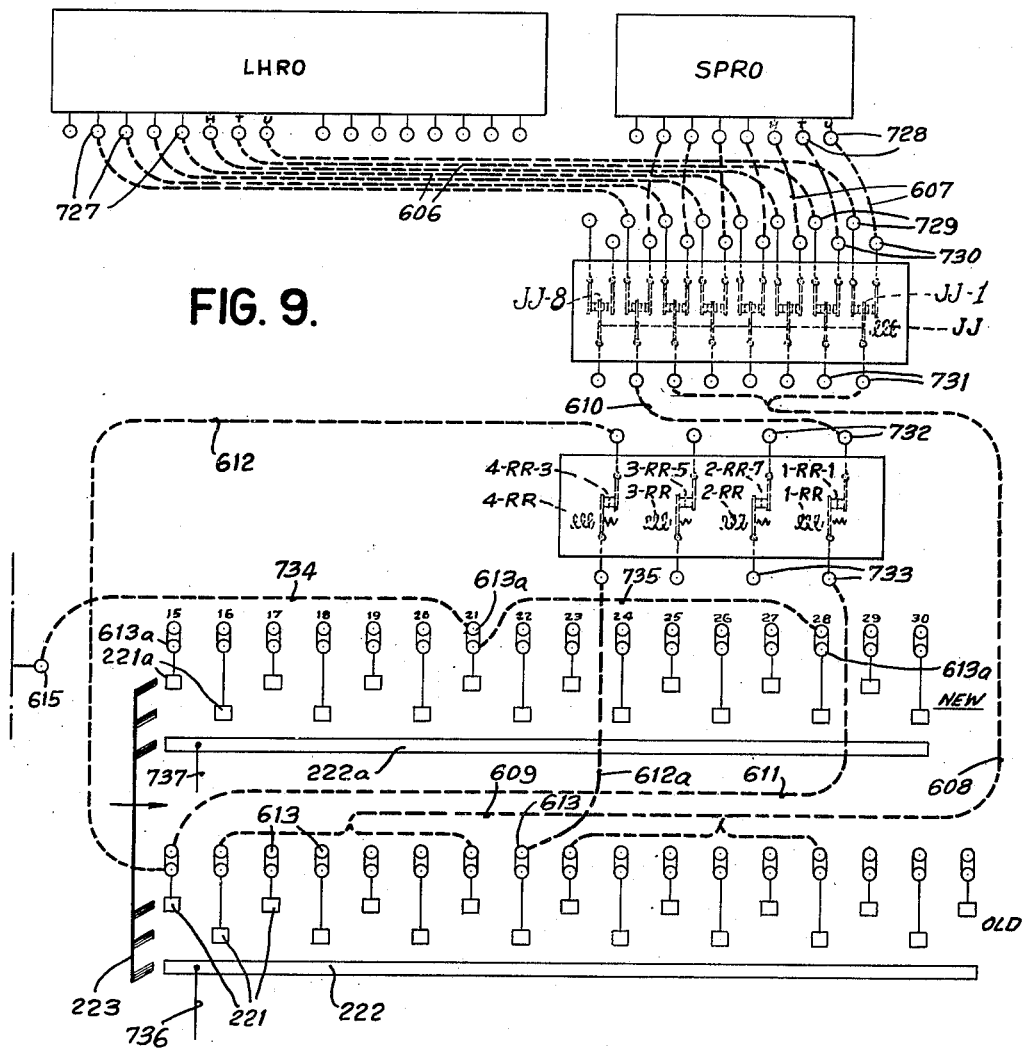

Fig. 9 is a diagram of plug connections made between the product accumulators and the punching mechanisms.

Figure 10:
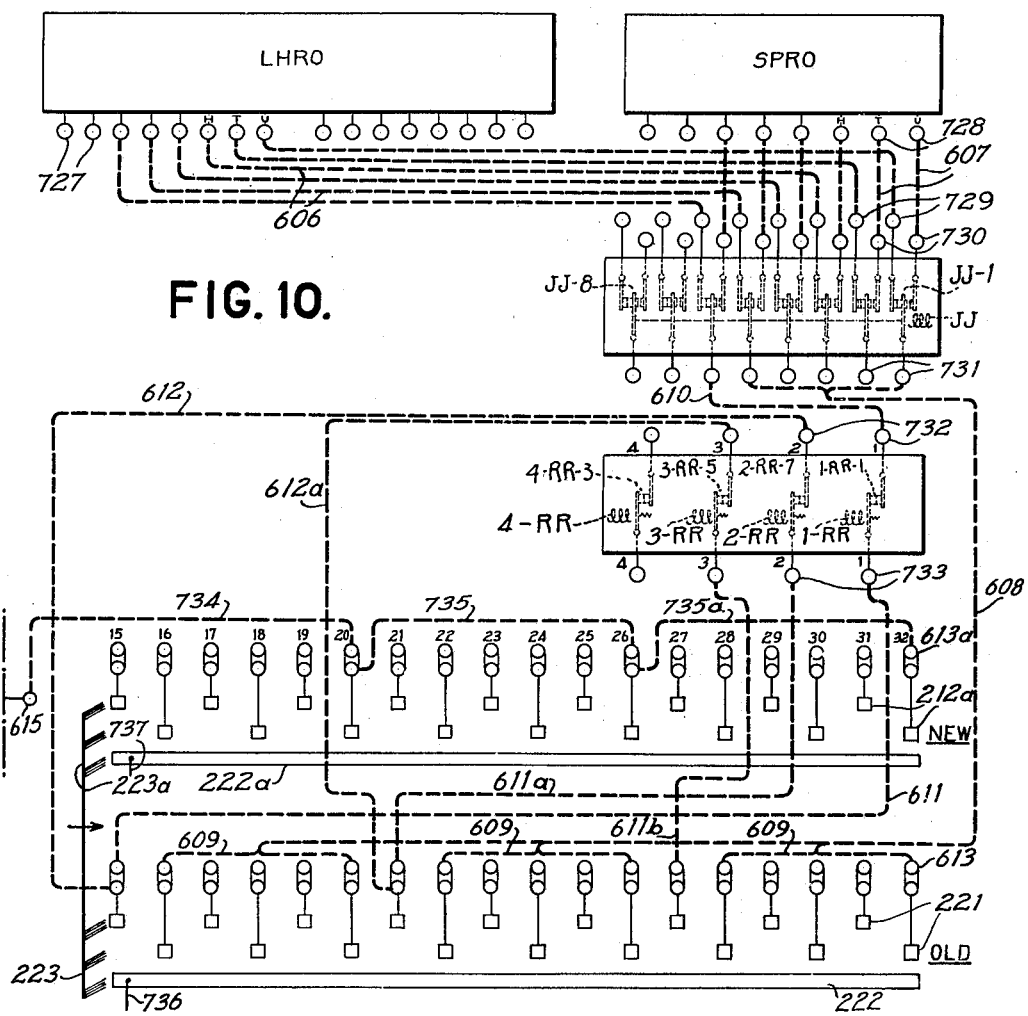

Fig. 10 is a diagram of plug connections made between the product accumulators and the punching mechanism where three single digit multipliers are involved.

Figure 11:
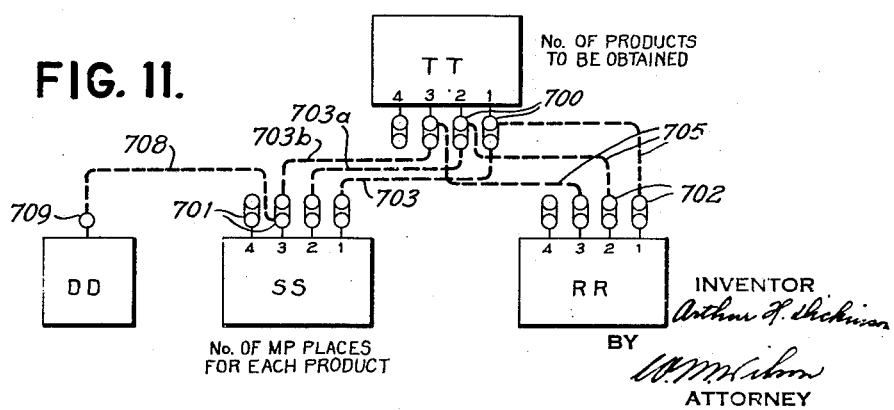

Fig. 11 is a further plugging arrangement required for three single digit multipliers.

A general description will first be given of the various units and their location in the machine. The machine embodies a card feeding and handling section which is shown in Fig. 1a and also in cross section in Fig. 2. This part of the machine is arranged to feed cards and derive readings therefrom, and afterwards pass each card into the punching section of the machine, which is of the successive column punching type. A small portion of the punching mechanism is shown in Fig. 1a and the rest of the punching mechanism is shown more completely in Figs. 5 and 5a. The machine is predicated on the structure of a multiplying punch of the type disclosed in the patent to G. F. Daly, No. 2,045,437, granted June 23, 1936. The mechanical structure of the present machine is substantially that of the machine of the patent referred to and such changes in structure as have been made will be pointed out as the description progresses.

For purposes of easier cross-reference, the parts in the present description, which correspond to like parts in the patent, are designated with the same reference characters and the timing of like-numbered parts will be the same.

The accumulators and receiving devices of the machine are as follows:

In the upper part of the machine, there is shown the RH, LH, and SP accumulators. In the lower part of the machine, there are two accumulators which are used as multiplier and multiplicand entry receiving devices which are respectively designated MP and MC in Fig. 1. The machine also includes a multiplying relay unit which is in the lower part of the machine (Fig. 1a) and generally designated MPR. Also in the lower part of the machine there is another multi-contact relay unit for column shifting and control purposes which is generally designated CS and CR. The machine also includes a number of emitter mechanisms, cam contact devices, impulse distributors, etc.

Machine drive

The machine is driven by a constantly running motor Z (Fig. 1) which motor, through a belt and pulley and ratchet drive, drives a shaft 51, which, in turn, drives an A. C.-D. C. generator 52.

Shaft 51, through worm gear drive 53, drives a vertical shaft 54 for driving the units of the upper and lower sections of the machine. At its upper end, shaft 54, through worm gear 55, drives the main drive shaft 56. The various accumulators are driven from this shaft in the customary manner.

The reset drive for the upper accumulator units is provided as follows: Shaft 56 carries a spur gear 57 driving a gear 58 with a 4:1 drive ratio. Gear 58 has extending from it four Geneva pins 59 cooperating with the other or cross element of the geneva designated 60. Secured to 60 is an internal gear 61 meshing with the spur gear 62 mounted on the end of the reset shaft 63. The accumulators are reset from this reset shaft in the customary manner by electromagnetically controlled one-revolution clutches. The drive for the lower units of the machine is substantially as previously described; i. e., the shaft 54, through worm gearing 55b, drives the lower drive shaft 56b, which shaft is also used for actuating parts in the MPR, CS, and CR units. A similar Geneva drive 57b, 58b, 59b, and 60b is provided to drive an internal gear 61b which meshes with a pinion 62b on the end of the lower reset shaft 63b. The lower reset shaft 63b resets the MP and MC entry receiving devices by means of the usual electromagnetic one-revolution clutches.

Card feed and card handling unit drive

Figure 1:
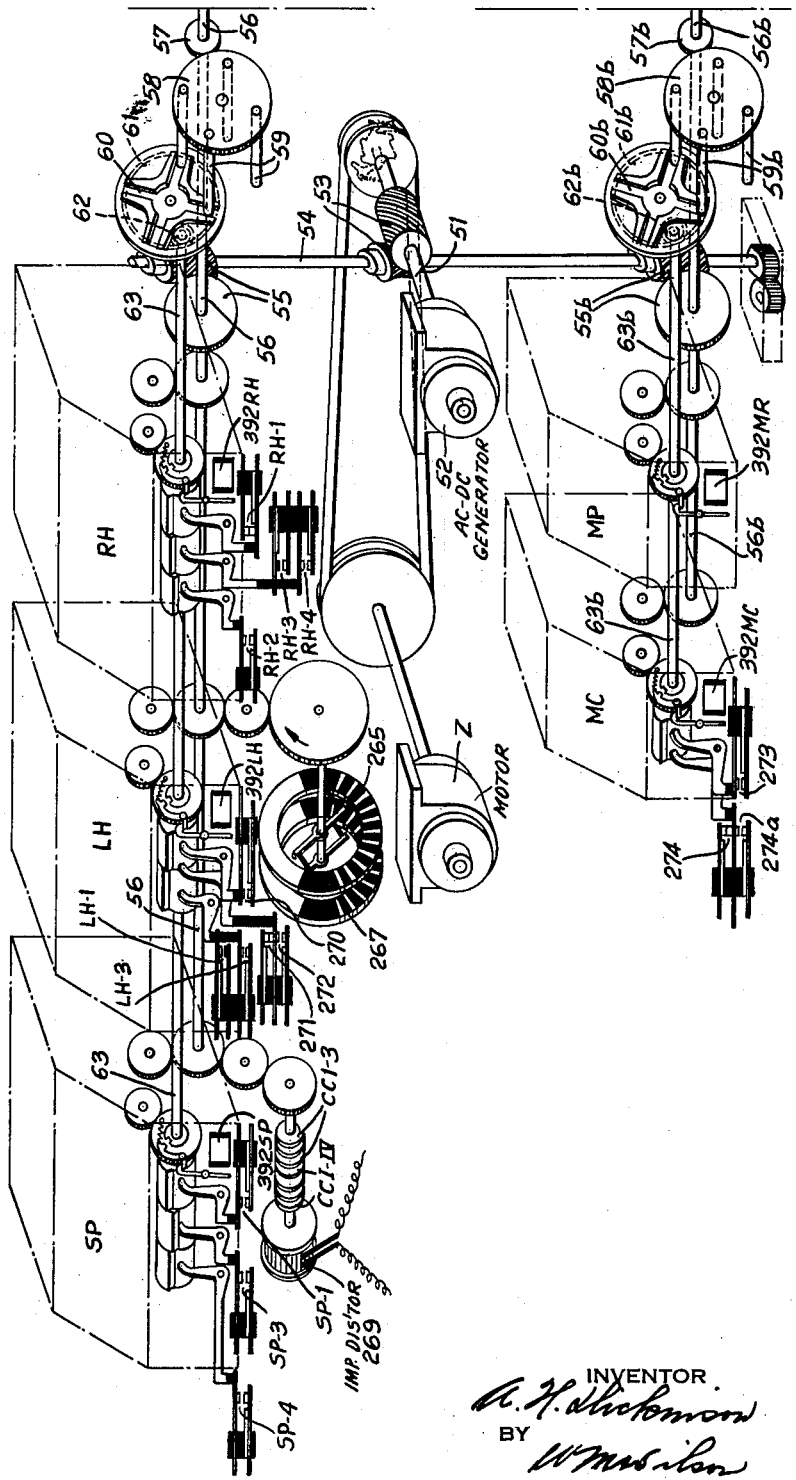
Figure 1A:
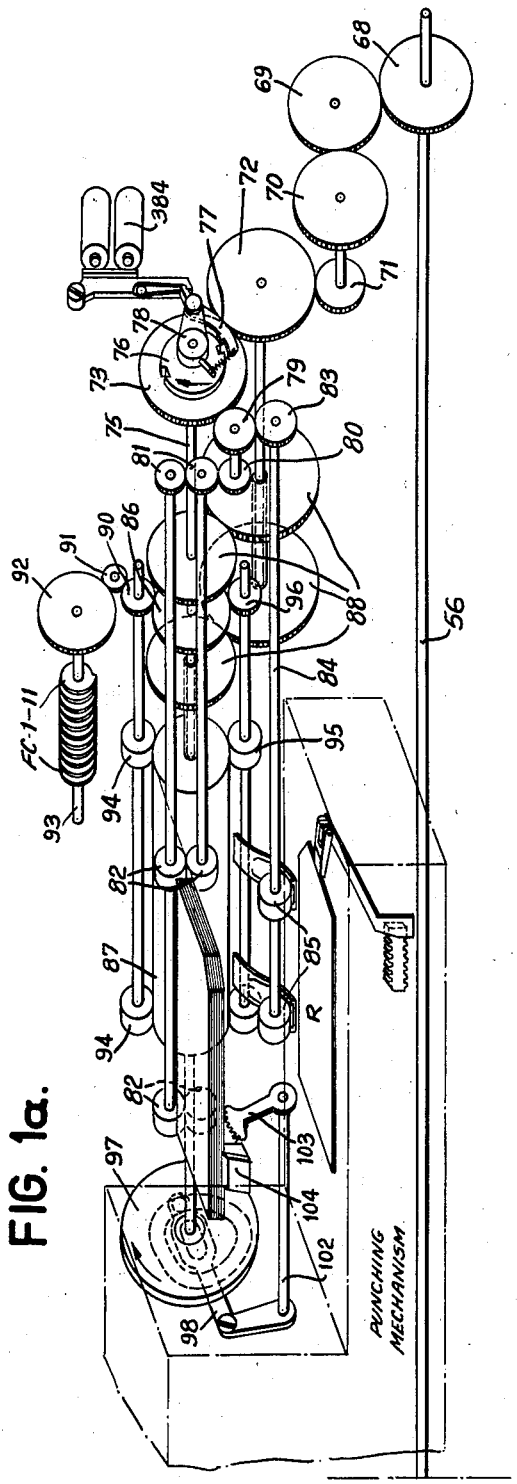
Figure 1A:
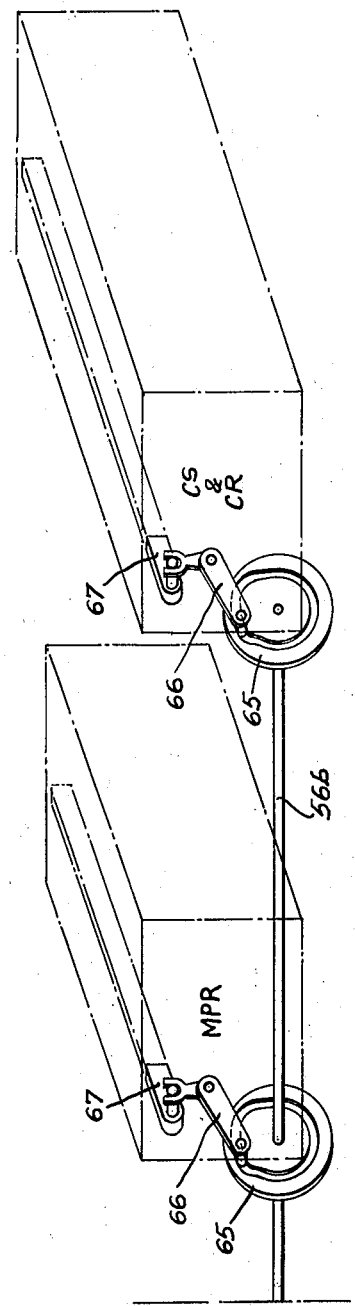
Figure 2:
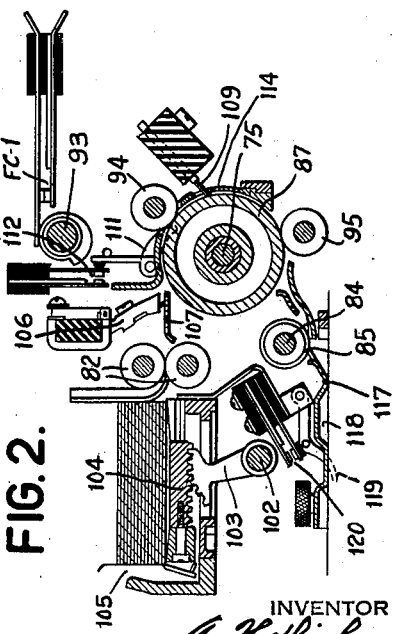
Fig. 2 is a vertical sectional view taken through the card handling and reading section of the machine.

Referring to Figs. 1a and 2, the shaft 56 is provided with a gear 68 which, through an idler gear 69, drives a gear 70 which, through its shaft, drives gear 71, which gear 71, in turn, drives gear 72. Gear 72, in turn, drives a gear 73 revolubly mounted on shaft 75. Gear 73 has fixed to it one element 76 of the one-revolution clutch, the complemental part of which comprises a pawl 77 carried by an arm 78 which is fixed to shaft 75. The one-revolution clutch is of the customary electromagnetic type used in the tabulating machines and with this one-revolution clutch engaged by the energization of its clutch magnet 384, the shaft 75 will rotate in unison with gear 73 and, with the one-revolution clutch disengaged, 73 will continue its rotation and shaft 75 will remain stationary.

Gear 73 also drives an intermediate gear 79 which is fixed to the gear 80 which drives a train of gears 81 and which, in turn, drive the card feed rolls 82 of the machine. Such card feed rolls 82 are constantly rotating feed rolls, rotating at all times when gear 73 is rotating and when the main accumulator drive shaft 56 is rotating. Also in train with gear 79 is a gear 83, which gear constantly drives a drag roll shaft 84 having fixed thereon a pair of drag rolls 85. Mounted on the shaft 75 is the card transfer contact cylinder 87 which is freely mounted on the shaft and driven by gearing generally designated 88 in the customary manner.

A gear 86 fixed to shaft 75 through gearing designated 90, 91, and 92 drives a shaft 93. This shaft has secured upon it a number of cams for actuating the FC group of cam contact devices of the machine. Such cams are so driven that they make one revolution per card feed cycle. Fixed to the shaft of gear 90 are card feed rolls 94 which are spring-pressed into contact with card transfer and contact cylinder 87. Similar spring-pressed card feed rolls 95 also cooperate with the contact roll 87 and such rolls are driven by the gear 96 in train with gear 86.

Card picker drive

The shaft 75 has secured to it a box cam 97 with which a follower 98 cooperates. The follower rocks a shaft 102 carrying a gear sector 103 which is in engagement with a picker block 104. Upon engagement of the one-revolution clutch, the picker is called into action to withdraw a single card from the magazine 105 and advance this card into the bite of rolls 82. These rolls, in turn, forward the card to the card transfer and contact roll 87. Intermediate rolls 82 and the cylinder 87 there is provided an advance or X brush sensing station. At this station may be brushes designated 106 which cooperate with the combined contact and card guide plate 107. The advancing card is carried around by the forward rotation of the transfer cylinder and by the rotation of rolls 94 to traverse the main card sensing brushes generally designated 109 in Fig. 2. Actuated by the card is the pivoted card lever 111 which effects closure of the usual card lever contacts 112. After the card has been sensed by the main sensing brushes 109, it is advanced between guiding member 114 to feed rollers 95, which advance it to the drag rolls 85. The rolls 85 deliver the card into the tray of the punching section of the machine under the guiding member 117, and, after the card has been freed from the drag rolls, it is flipped down into the tray of the punching section. The location of this tray is generally designated at 118 in Fig. 2 and the position of the card in the tray is indicated at R in Fig. 1a. A card lever 119 (Fig. 2) is also provided adjacent to the tray for closing card lever contacts 120 when a card is lodged in the tray of the punching section.

With the traverse of the card past the main card sensing brushes 109 the amount of the multiplier and multiplicand will have been read from the card and entered into the MP and MC receiving devices of the machine. The MP and MC receiving devices and the LH, RH, and SP accumulators are of the usual type as customarily used in tabulating machines and are provided with electromagnetically operated clutches.

Multi-contact relays

The machine is provided with so-called multi-contact relays which are contained in the units designated MPR, CS and CR in Fig. 1a. These relays are electromagnetically tripped and mechanically restored. The detailed manner of construction of these relays is fully shown and described in the patent referred to and such explanation will, therefore, not be repeated herein, except to point out that the restoring mechanism for the relays is shown in the lower part of Fig. 1a and comprises cams 65 carried on the lower drive shaft 56b, which cams rock levers 66 to cause reciprocation of the relay restoring bars 67 which correspond to like-numbered parts in the Daly patent.

Punching mechanism

The punching mechanism is of the customary successive-column acting, repetition-punching type as generally used in machines of this class. It is generally of the form shown in Lee & Phillips Patent No. 1,772,186 and in Lee & Daly Patent No. 1,976,618. The mechanism of the punching section includes two card feed racks 181 and 182 (Figs. 5 and 5a). 182 carries an arm provided with pusher fingers 183. The drive is by a separate motor Z—2 which, through the driving gear shown, drives shaft 184 which has a ratchet-shaped clutch element 185 fixed on one end of it. Alongside of 185 is a gear 186 which meshes with the lower teeth of 181. Secured to 186 is a disk 187. Pivoted on 187 is a member 188 provided with a ratchet-shaped clutch tooth 189. Alongside of 188 is another member 188b which lacks the clutch tooth. On 188 is a pin 188c overlying an arcuate surface of 188b. The free end of 188b is connected to a toggle member 190 by a link 191. 190 is pivoted on 187 at 192. The opposite end of 190, remote from its pivot 192, is connected to a spring element 193, which spring tends to hold the clutch tooth 189 out of engagement with the clutch teeth of element 185 and allows it to engage when 190 is shifted.

For the purpose of effecting a clutching action, a punch feed clutch magnet 194 is provided. This magnet when energized attracts its armature and causes an arm 195 to engage a pin 196 (see Fig. 5a, in which figure the extension of this arm 195 is shown broken off for clarity of illustration of the other parts), depressing 188b and allowing 188 to descend so that the tooth 189 engages with the ratchet 185. Upon such engagement, the gear 186 will be driven in counterclockwise direction substantially a single revolution, shifting rack 181 to the left. This action will, through the card pusher shown in Fig. 5a, move the card from the R position to the R—1 position. Also when magnet 194 is energized, an arm 195a on the armature will close contacts 197. Such contacts are latched closed by a latch 198 (see Fig. 6). The latch 198 is tripped to allow the contacts to reopen by a knock-off 199 carried on the back of gear 186 (see Fig. 5a). At the termination of the counterclockwise movement of gear 186 the tails 200 of parts 188 and 188b will strike a projection 201 on a fixed plate to effect the disengagement of the tooth 189 from the ratchet 185. This action also restores the toggle parts to normal position.

The above driving action has wound up a spring in barrel 202. Upon disengagement of the one-revolution clutch tooth 189, rack 181 returns to the right under the influence of the spring in barrel 202.

The driving train to the second card carriage rack 182 is as follows: Rack 181 has its upper teeth intermeshed with gear 203, which has secured to it a member 204 having a single notch or tooth disposed in the plane of a pawl 205 which is pivoted on part 206 fixed to the shaft 207. 207 on its opposite end carries a gear 208 which meshes with the card carriage rack 182. Suitable mechanism controls the co-action of pawl 205 with member 204 so that with the rack 181 in extreme right hand position pawl 205 will be disengaged from the clutch element 204. Such disengagement is effected by the rocking of 209 in a clockwise direction by the co-action of the pin 210 with a block 211 carried on rack 181. Upon initial movement of 181 to the left the block 211 will clear the pivoted camming element 209 allowing a slight counterclockwise motion of it so that 205 under spring action may rock and engage the tooth of member 204. Thereafter, drive will come from 181 through gear 203, through 204, to pawl 205, to 206, to shaft 207 so that a clockwise rotational movement will be imparted to 207. This action will, through gear 208, traverse rack 182 to the right. The card carriage rack 182 will thus be shifted to extreme right hand position permitting the card pushers 183 (Fig. 5) to first ride over the surface of the card and ultimately engage back of the trailing edge of the card at the R—1 position.

Rack 182 has associated with it a spring drive comprising the usual spring barrel 212. This spring is wound up by the traverse of 182 to the right and is adapted to cause a movement of 182 to the left under spring action. The rack 182 also has associated with it an escapement mechanism 213 (Fig. 4b) having a dog 214. This escapement is more fully described in Schaaff United States Patent No. 1,426,223 and in Lee & Phillips Patent No. 1,772,186 and in the patent to C. O. Wellman, No. 2,063,475. The usual controlling contacts 215 customarily used in machines of this class are also provided, cooperating with the escapement parts.

Removably secured to the card carriage rack 182 is a skip bar 216 provided with a notched portion 217 which permits skip lifter lever 218 to descend when in the notch or to remain elevated when riding on the high part of the skip bar. When the skip lifter lever descends into the notch it allows the dog 214 of the escapement mechanism to cooperate with the ratchet teeth of rack 182. With skip lifter lever 218 riding on the top of the skip bar 216 the escapement will be disabled so that the card carriage rack 182 can traverse without stopping at each card column until the notch 217 is reached. Thereafter there is an intermittent motion of the card carriage to the left under spring action and under escapement control. When the skip lifter lever again rides out of the notch the card carriage rack 182 takes its full excursion of movement to the left. The location of the beginning of the notch in the skip lifter lever bar determines the position for the beginning of result or other punching. When the escapement dog is lifted up the contacts 215 are open as is customary in machines of this class. It may be explained that various forms of skip bars having one or more notched portions 217 can be placed in the machine depending upon the class of work which is to be performed.

Figure 7A:
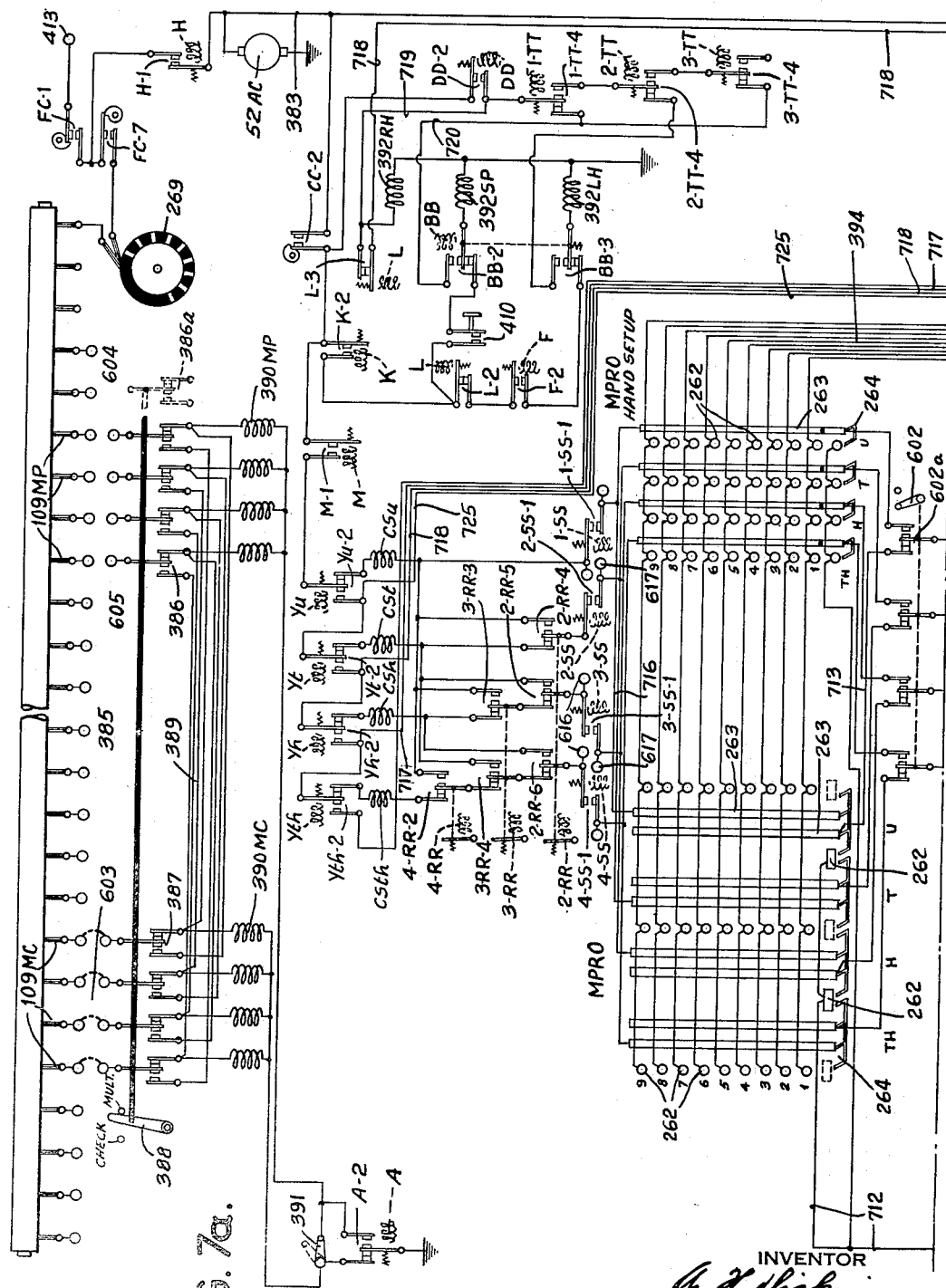
Figure 7B:
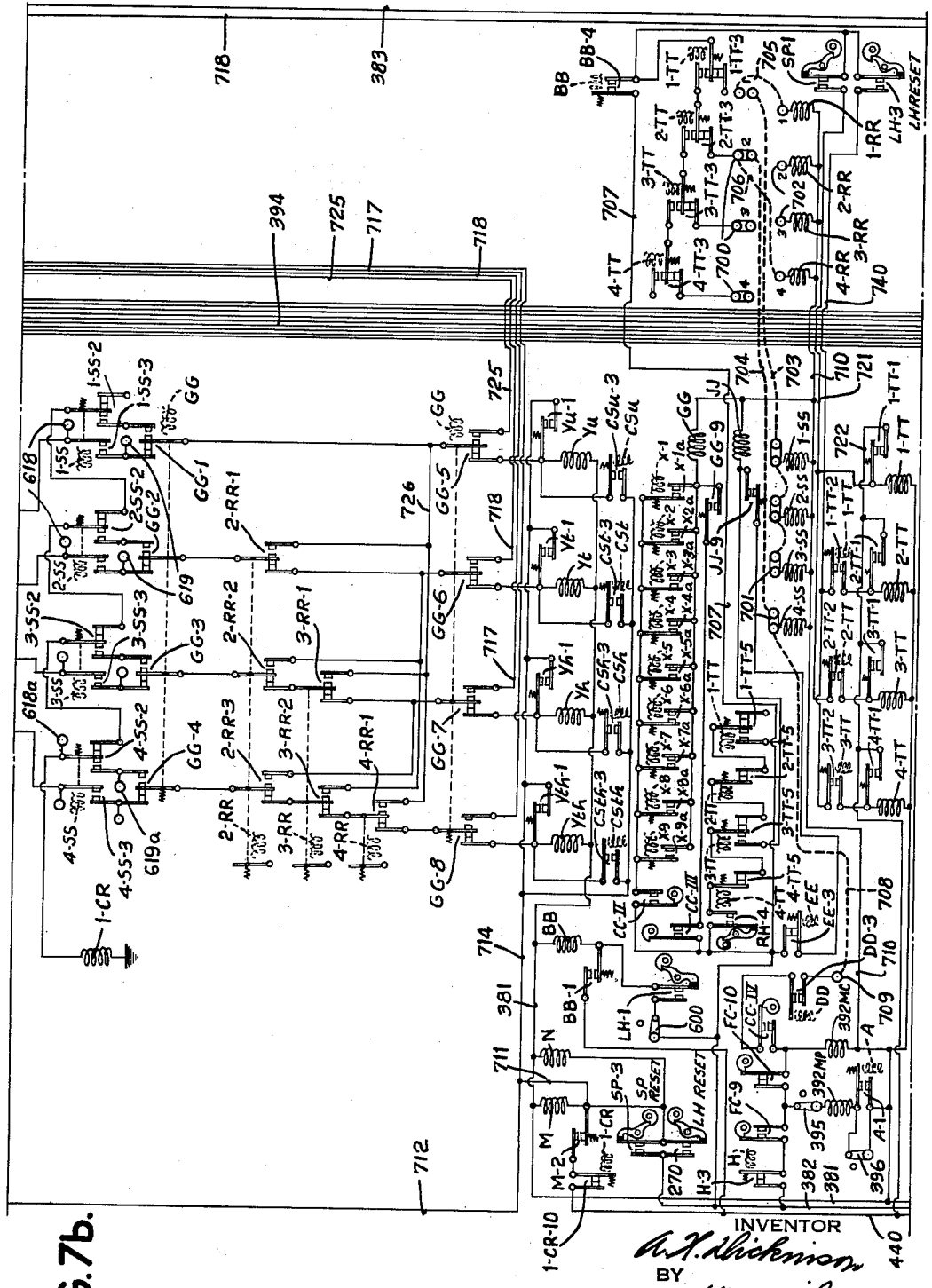
Figure 7C:
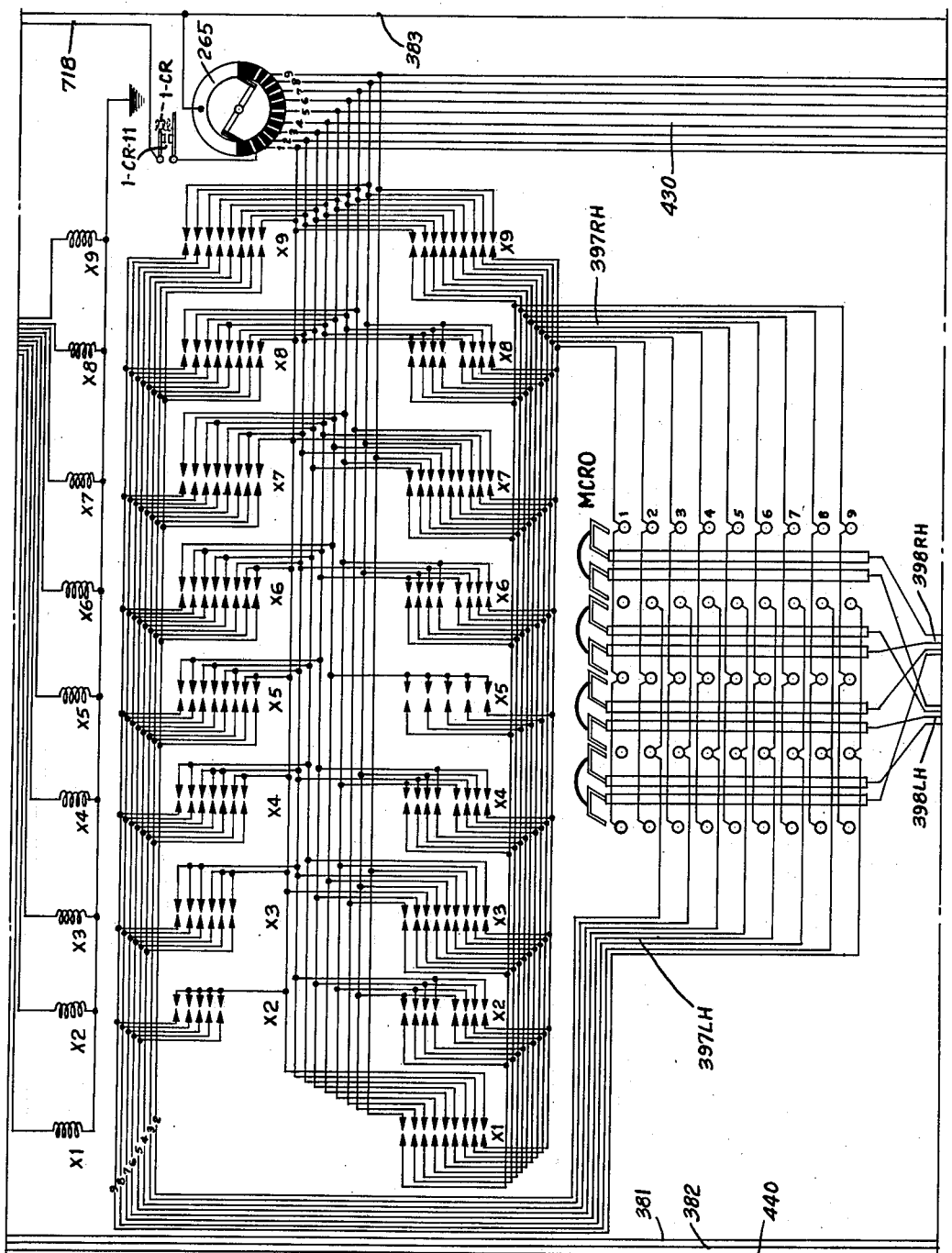
Figure 7D:
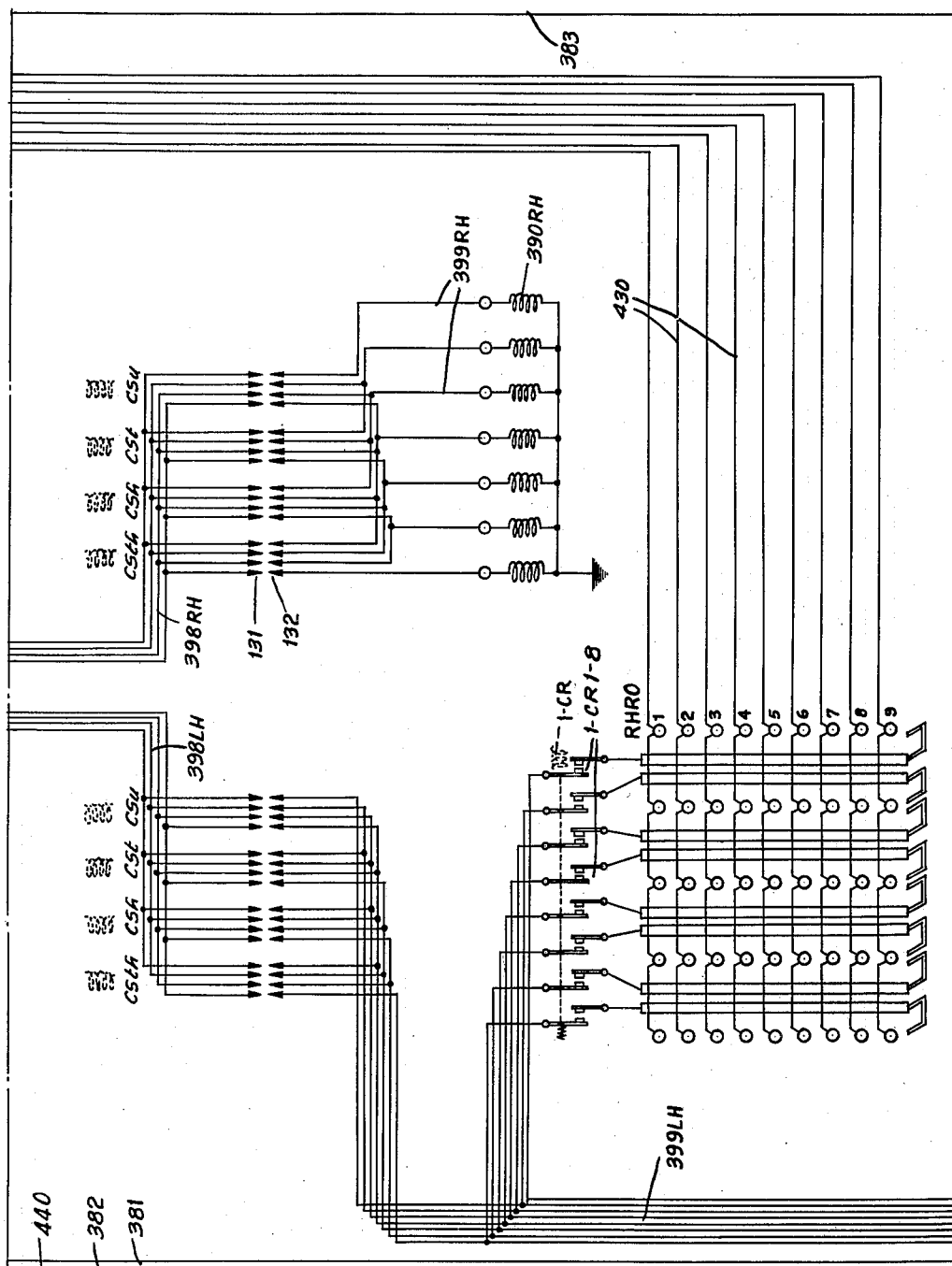

The punching mechanism proper need not be fully described as it is set forth in the Lee & Phillips patent and in the Lee & Daly patent above referred to. In brief, it comprises a set of punches 219, which punches are adapted to be depressed to perforate the card through interposers not shown, but which are under the control of punch selector magnets 407 (Fig. 7c).

Referring to Fig. 5 there is shown disposed alongside of the card carriage rack 182 and fixed to the frame of the machine, a block or strip of insulating material 220. Disposed in this block are a number of spots 221 of conducting material and alongside of these spots is a common strip of conducting material 222. A suitable bridging piece or multiple brush assembly 223 is carried by the card carriage rack 182 and as this card carriage rack moves, the bridging brush 223 is displaced and establishes circuit connections from the common strip 222 to one of the spots 221 depending upon the columnar position of the card carriage rack 182. Spots 221 are preferably placed in two rows and inter-staggered as shown. This structure will be hereinafter termed a "reading strip."

For the purposes of the present invention, an additional reading strip is provided positioned above the first and with its brushes 223a connected to the brushes 223 for concurrent movement across its spots 221a and common strip 222a. Also for the purposes of the present invention, there is provided an additional pair of contacts 215a positioned above the contacts 215 as shown in Fig. 4b.

*Card ejector*

Referring to Fig. 5, after the card has reached the R—1 position and has been traversed past the punches and has been punched or traversed past the punches without punching, it ultimately reaches a position at the extreme left hand position of the punching section of the machine from which point it must be discharged into the discharge hopper.

The card eject mechanism is shown in Fig. 5 with the parts shown in the position which they assumed before the machine was started into operation or in the eject position. Upon the first card feeding operation through the punching section of the machine, rack 181 will have moved towards its extreme left position. After reaching the dotted line position shown in Fig. 5, 181 moves further to the left and thrusts a rack 224 to the left compressing coil spring 225. Bearing against a shoulder on rack 224 is a contact operating part 226. When 224 is thrust to the left, contacts P—3 which were previously closed, will open under their own spring action. The thrusting of 224 to the left will also allow a member 224a to rock and allow contacts P—4 which were previously closed to open. The displacement of rack 224 to the extreme left position will, through intermediate gears 227, rock a shaft 228 in a clockwise direction to bring an ejector clip assemblage 229 away from the position shown in Fig. 5 to a position in which the ejector clip can receive a card which has been advanced through the machine. With the ejector clip assemblage 229 disposed in such card receiving position, the assemblage will be latched in such position by a latch 231, which latch is fully described in U. S. Patent No. 1,976,618 (see latch 216 of that patent in Fig. 16). The ejector clip latch is adapted to be released by an ejector clip magnet 232. Upon energization of the eject magnet 232, latch 231 is released so that the ejector clip assemblage which has then grasped a card, swings from the card receiving position to the position shown in Fig. 5, in which position the jaws of the ejector are opened up so that a card can be discharged therefrom.

*Contact devices in punching section of machine*

The contact devices P—3 and P—4 have previously been described. In the punching section there are other contact devices as follows: Contact devices P—1 (Fig. 5a) are contacts which are closed when the rack 181 is in extreme right hand position and ready to receive a card from the card handling and sensing section of the machine. Contacts P—2 (Fig. 5a) are normally closed contacts and are arranged to open up when rack 181 makes a complete movement to the left. Contacts P—5 (Fig. 5) are also provided. Such contacts are operated as follows: An extension 235 on rack 182 is adapted, when rack 182 has passed beyond the last card column position, to allow contacts P—5, which were previously open, to close. Such contacts P—5 are normally open when rack 182 is in any of the positions to the right of the position beyond the last column position.

*Readout devices*

Each of the accumulators MP, MC, LH, RH, and SP contain so-called readout devices which comprise a brush structure which is differentially displaced in accordance with the amount standing in the accumulator. This brush structure cooperates with contact blocks and contact strips which are illustrated diagrammatically in the circuit diagram. For example, in Fig. 7e, the readout device of the SP accumulator is designated SPRO and shows the relationship diagrammatically between the contact spots 262, common strips 263, and the brushes 264. If an order of the accumulator contains, for example, the number 5, the brush 264 in that order will be in position to electrically connect the common strip 263 with the spot 262 in the 5 position. In certain of the accumulators, as will be explained in connection with the circuit diagram, there is provided a double readout arrangement by means of which a duplicate setting of the amount in the accumulator is obtained. This double readout arrangement also is fully shown and described in the Daly patent.

*Emitters and cam contacts*

The main drive shaft 56 is adapted to drive the cams of certain CC cam contact devices. These cams are correspondingly numbered on Fig. 1 CCI—3 and CCI—IV. Also driven from the shaft 56 are two emitters 265 and 267 which are of conventional construction. An impulse distributor 269 is also provided which is driven in unison with the CC cams.

*Reset control contacts*

In Fig. 1, the reset gear of the LH accumulator is shown provided with a cam which, upon the reset of this accumulator, causes closure of contacts 270, opening of contacts 271 and closure of contacts 272. Similarly arranged reset contacts are provided in association with the MC, RH, and SP accumulators.

*General description*

Before explaining the specific circuit connections a general explanation will be given of the procedure followed in carrying out a given problem with particular reference to Figs. 4a and 8.

In Fig. 8 the multiplicand amount 1111 is to be multiplied by the multiplier amounts 537 and 9 in succession and the products PR—1 and PR—2 punched back in the card. During the card feeding cycles (see Fig. 4a) the MC and MP amounts are entered into the MC and MP accumulators as indicated in Fig. 8 with the MP—2 amount to the right. After the entering cycles, the card is advanced to the punching unit in readiness to receive the product punching and at the same time there is an LH accumulator resetting operation. Following this the MC 1111 is multiplied by MP 537 with the partial products entered into the LH and RH accumulators as indicated, this being in accordance with usual multiplying procedure so that at the end of the multiplying cycles of which there will be three, one for each MP digit, the LH accumulator will stand at zero and the RH accumulator at 596607.

The next cycle is an RH to LH transfer cycle transferring the RH partial products to the LH accumulator. In the succeeding cycle the RH and SP accumulators are reset and at the same time punching operations commence to punch the first product in the PR—1 field of the card. The machine is now ready to multiply the MC amount by the second multiplier and this it proceeds to do by computing and entering the partial products into the SP and RH accumulators and effecting an RH to SP transfer to obtain the PR—2 product in the SP accumulator.

If punching of the first product is completed before the RH to SP transfer, further punching awaits completion of such transfer and if the transfer is completed, further operations await completion of the first product punching. When both operations are completed, the MC, MP, RH and LH accumulators are reset and punching of the second product takes place concurrently therewith.

Figure 4:
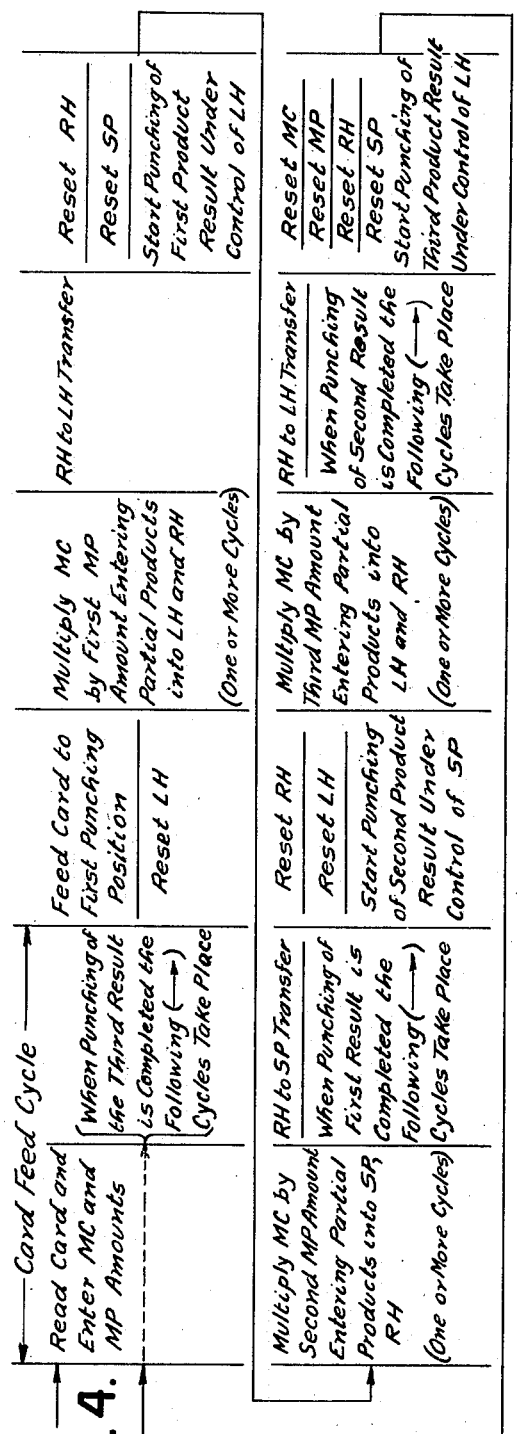
Fig. 4 is a diagram showing the sequence of operations in the machine for multiplying by three successive multipliers.
Figures 4A, 4B:
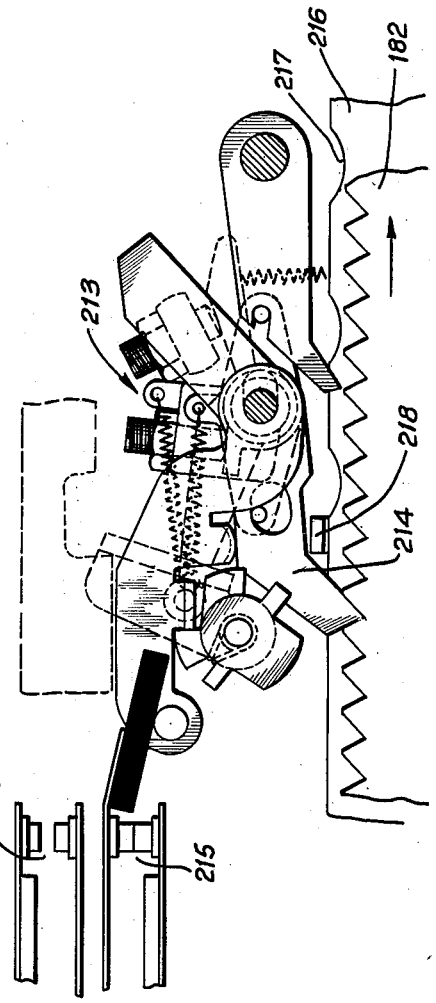
Fig. 4a is a similar diagram for multiplying by two successive multipliers.
Fig. 4b is a detail of the escapement mechanism of the punching unit and contacts controlled thereby.

Fig. 4 outlines the sequence of events where three multiplier amounts are each to be multiplied by the common multiplicand. In this case, when the RH to SP transfer has been effected, only the RH and LH accumulators are reset while punching of the second product takes place and thereafter the third set of multiplying operations take place resulting in an RH to LH transfer and if the second product is punched by this time, the MC, MP, RH and SP accumulators are reset.

*Circuit diagram*

In setting the machine into operation, prepunched cards are first placed in the card magazine of the machine. The first operation is then to close the switch 380 (Fig. 7f) providing current supply for the main driving motor Z. The motor Z drives the A. C.-D. C. generator 52, the D. C. section of which supplies direct current to the D. C. lines 381 and 382. Alternating current impulses are supplied to ground and to line 383 (see Fig. 7a). The start key is now depressed to close start key contacts 275 (Fig. 7f) and to complete a circuit from the 381 side of the D. C. line through relay coil C, contacts 275, relay contacts G—1 now in position shown, cam contacts FC—2 to the 382 side of the D. C. line. A holding circuit is established through the contacts C—2 of the relay coil C and cam contacts FC—8 now closed. Energization of coil C also closes relay contacts C—1 and a circuit is established which is traceable as follows: from the 381 side of the D. C. line, through relay contacts F—1, which are now in the position shown, card feed clutch magnet 384 (see also (Fig. 1a), through cam contacts FC—6 now closed, stop key contacts 276 now closed, relay contacts N—1 and C—1, punch controlled contacts P—1 and back to the other side of the line.

In the present machine, the start key must be held depressed for the first four cycles in starting up upon a run of cards or, alternatively, it may be depressed and released and then depressed a second time. Starting is prevented until the feed rack 181 of the punch is in right hand position. This is provided for by the contacts P—1. The first complete card feed cycle upon starting up the machine will advance the first card to a position where the X (first extra index point position on the card) will be in alinement with the special X brush 106, in which position the "9" index point position of the card will be about ready to pass under brushes 109. At the beginning of the second card feed cycle, the card traverses the brushes 109 and the multiplier and multiplicand are read from the card and entered into the MP and MC receiving devices. At the end of the first card feeding cycle, the card lever contacts 112 will be closed by the card, causing energization of relay coil H and closure of contacts H—1 (Fig. 7a). As the second card feed cycle ensues, the card is carried past the brushes as before explained and amounts are entered into the multiplicand and multiplier receiving devices.

The entry circuits will now be traced. Current flows from the A. C. line 383 (Fig. 7a) through relay contacts H—1 now closed, cam contacts FC—7, distributor 269 to card transfer and contact roll 87, thence through the brushes 109 pertaining to the multiplier, these being designated 109MP on Fig. 7a, through the brushes 109MC pertaining to the multiplicand, to the plug sockets of the plugboard 385. The customary plug connections are provided at this plugboard and connected to the lower plug sockets are three-blade contacts 386 and 387. Such three-blade contacts are in the position shown for normal multiplying operations and may be manually shifted by the manual member 388 to reverse position for checking purposes. The cross wiring generally designated 389 and the three-blade contacts are provided for reversal of the entries into the MC and MP accumulators. The entry circuits extend to the multiplier magnets 390MP and to the multiplicand magnets 390MC. For normal multiplying operations, switch 391 is in closed position as shown so that the ground return circuit is through the relay contacts A—2 which are in the position shown. The contacts A—2 will be reversely thrown from the position shown by the energization of relay coil A, as will be hereinafter explained. During entry of the multiplier and multiplicand upon normal multiplying, coil A is in deenergized condition.

It may be explained that there is a manual starting up of the card feed for the first cards of a run, but that after the machine is fully in operation on subsequent cards in a run, the feed is otherwise controlled, being effected automatically. Subsequent card feed operations will be initiated automatically upon and by the reset of the MC receiving device. Provision is accordingly made to cut off the hand initiated control after the operations have been properly started. This is effected in the following manner. At the beginning of the second card feed cycle, the closure of cam contacts FC—11 (Fig. 7f) will cause relay coil G to become energized. Current flows from line 381 to relay G, contacts FC—11, card lever contacts 112 now closed, to line 382. Energization of coil G will shift the three-blade relay contacts G—1 to reverse position from that shown interrupting the circuit to the start key contacts 275, but maintaining the circuit to cam contacts FC—2. The energization of relay coil G will also close relay contacts G—2 and establish a stick circuit for coils G and H through either the FC—2 contacts or the card lever contacts 112. It may be explained that the making time of cam contacts FC—2 overlaps the time when the card lever contacts 112 open between cards.

The card is fed through the card handling section of the machine and ultimately it passes to the R position in the punch, closing card lever contacts 120 and energizing relay coil F, causing the shifting of relay contacts F—1 to reverse position from that shown. In starting up the machine, the carriage racks are in extreme outer position; that is, rack 181 is in its extreme right hand position and 182 is in its extreme left hand position (see Figs. 5 and 5a). Accordingly, contacts P—1, P—3, P—4, and P—5 (Fig. 7f) are closed. With contacts P—5 closed, relay coil K will be energized and relay contacts K—1 will be shifted to reverse position from that shown. Upon the shifting of relay contacts F—1 and upon the closure of cam contacts CC—3, a circuit will be established to the punch clutch magnet 194. This circuit is completed from line 381, upper contacts F—1, contacts CC—3, punch clutch magnet 194, contacts P—3, upper contacts K—1 to line 382. The energization of the punch clutch magnet 194 will cause closure of contacts 197 which become latched closed by latch 198. Accordingly, current supply is provided for the punch driving motor Z—2. The card which has been previously read and which is now in the punching position in the R position is advanced endwise through the punch unit to the position in which punching is to commence.

The actual multiplying operation and the set-up of the cycle controller is initiated by the reset of the LH accumulator. Such reset is initiated and effected in the following manner.

It has been explained how relay coils F and K were energized. Energization of these two coils closes relay contacts F—2 and K—2 (Fig. 7a). Upon closure of cam contacts CC—2, current flows from line 383 through contacts CC—2, K—2, through normally closed relay contacts L—2, contacts F—2, relay contacts BB—3 now in position shown, through the 392LH reset magnet and thence to ground. Energization of magnet 392LH initiates the resetting of the LH accumulator (see Fig. 1). It may be explained that resetting cannot occur until the relay contacts K—2 are closed which can occur only when a card is in the punch beyond the last columnar position, or in starting up the machine, when the punch racks are in proper position, i. e., extreme outer position. It may also be explained that relay coil F cannot be energized with the attendant closure of contacts F—2 until a card has reached the R position in the punch.

For the purposes of the present invention, an additional circuit for energizing the magnet 392LH under control of the relay contacts BB—3 is provided so that resetting of the LH accumulator may be effected at another time. This circuit will be traced hereinafter.

*Preliminary entry control plugging*

In order to better explain the operation of the invention, a specific problem will be considered in tracing out the various circuits and operations. The problem chosen is that diagrammatically represented in Fig. 8 in which an amount in the MC field is to be multiplied in succession by the amounts in the MP—I and MP—2 fields and the resulting products PR—I and PR—2 are to be punched back in the card as indicated. The MC amount is connected through the plug connections 603 (Fig. 7a) in the normal manner to the MC accumulator. The MP—I amount is connected through plug connection 605 to the first three orders of the MP accumulator, reading from right to left, and the MP—2 amount, which for conciseness is a single digit, is connected by plug connection 604 to the next or fourth order of the MP accumulator. For conciseness also, the circuit diagram has been arranged for the handling of four-place factors and the problem as outlined calls for two successive multiplying operations. The number of multiplier factors which may be chosen is variable; for example, for the capacity of the machine shown, there may be four separate multiplier factors, each comprising a single digit, in which case, these factors would be plug connected to the MP accumulator from left to right in the order in which it is desired to effect multiplying, having regard to the order in which the product punching is to appear on the record card. In the two-multiplier problem chosen, the product of the multiplicand and the three-place multiplier is to be punched in the left hand field so that the connections are made for multiplying by this three-place multiplier first and then by the single-place multiplier. If the product fields were to be reversed, the plugging would be inverted so that the single-place multiplier is entered in the right hand order of the MP accumulator and the three-place multiplier in the next higher orders.

For controlling various sequences and denominational allocations there are provided four relay coils designated I—TT to 4—TT (Fig. 7b) whose related contacts I—TT—3 to 4—TT—3 are wired to plug sockets 700. There are also provided four relay coils designated I—SS to 4—SS which are wired to plug sockets 701 and there are also four relay coils designated I—RR to 4—RR wired to plug sockets 702. In Fig. 8a, the three sets of plug sockets are shown with the relay units diagrammatically represented adjacent thereto and it is necessary, as a preliminary to the operation of the machine that certain plug connections be made between the three groups of plug sockets. The sockets 700 control the number of multiplying operations to be performed. For the present problem, there are two so that the sockets 700 numbered 1 and 2 are to be used. The sockets 701 are connected to sockets 700 as shown for the problem under consideration; that is, a plug connection 703 is made from the #1 socket 700 in multiple to the first three sockets 701, the connections being determined by the fact that for the first multiplying operation three places in the multiplier are to be involved. A further connection 704 is made from the #2 socket 700 to the #4 socket 701, determined by the fact that for the second multiplying operation one place in the multiplier is involved. A connection 705 is made from the #1 socket 700 to the first socket 702 of the RR relay unit and a second connection 706 is made from the #2 socket 700 to the #4 socket 702. These plug connections are determined by the nature of the problem.

As a further example, if there were to be four multipliers of a single digit each, the four sockets 700 would be separately plug connected, each to correspondingly numbered sockets 701 and also separately to the correspondingly numbered sockets 702.

*LH reset cycle*

When the K—2 and F—2 contacts are closed (Fig. 7a) the LH reset magnet 392LH is energized upon closure of contacts CC—2 as explained. During the resetting of this accumulator, its related contacts 270 (Fig. 7b) close at the time indicated in Fig. 2 and establish a circuit from line 382 through contacts 270, thence in parallel through relay magnets M and N, to line 381. Relay coil M closes its contacts M—2, establishing a holding circuit for both relays through the contacts I—CR—10 controlled by the relay I—CR. Also during the LH reset cycle, contacts LH—I (Fig. 7b) close completing a circuit traceable from line 381, relay coil BB, contacts LH—I, switch 600 in the position shown, to line 382. Relay BB closes its contacts BB—I to provide a holding circuit from line 381, relay BB, contacts BB—I, wire 440 (Figs. 7c, 7d, 7e, and 7f), multiplicand reset contacts 274 to line 382. Relay coil BB closes its contacts BB—4 at the right side of Fig. 7b which will establish a circuit traceable from line 382, wire 707, contacts BB—4, closed contacts I—TT—3 to socket 700, thence through plug connection 705 to the #1 socket 702, the relay I—RR, wire 710, to line 381. The contacts controlled by relay I—RR at this time have no immediate effect and their explanation will be deferred until later in the description.

A second circuit is completed by closure of contacts BB—4 which is traceable from line 382, wire 707, contacts BB—4, closed contacts I—TT3, the #1 socket 700, the plug connection 703 to the #1, #2, and #3 sockets 701, through the relay coils I—SS, 2—SS and 3—SS in parallel and wire 710 to line 381. The three SS relays serve to connect the first three orders of the multiplier readout device for controlling multiplying operations, and the circuits through the three SS relays are held until the completion of the first multiplying computation, at which time contacts I—TT—3 shift to break the circuit.

Figure 3:
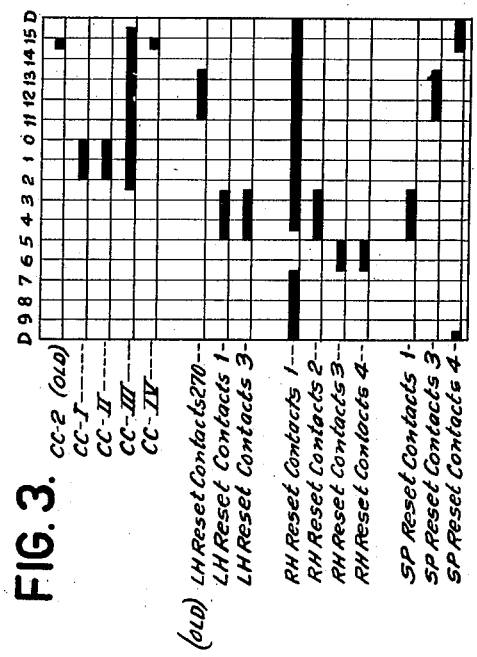
Fig. 3 is a timing diagram of the new contact devices of the machine.

Inspection of the timing diagram of Fig. 3 will show that the contacts LH—I close and open again before the contacts 270 close, thus causing the SS relay coils to be energized and their contacts to be shifted before the magnets M and N are energized. In the upper part of Fig. 7 are shown the contacts controlled by the SS relay magnets and with the three magnets I—SS to 3—SS energized their related contacts will be shifted from the position shown.

The machine is now ready to condition the cycle controller for eliminating multiplying cycles for orders of the first multiplier in which zeros occur. The relay magnets designated Yu, Yt, Yh, and Yth are the well-known cycle controller relay magnets which are energized when the corresponding accumulator positions contain zeros and which are also energized when multiplying under control of a digit in the related order has taken place. The principle of operation is substantially that set forth in the Daly patent and the controlling circuits have been modified for the purposes of the present invention.

As in the patent, the energization of the M and N relays allows a circuit to be completed which is traceable from line 382 (Fig. 7b), contacts 270, wire 711, wire 712 (Fig. 7a), through contact segment 262 farthest to the right if, for example, there is a zero setting at this position, its brush 264, units order common readout strip 263, wire 713, a closed pair of contacts 602a farthest to the right, down through the now closed contacts I—SS—3 (Fig. 7b) and the nonshifted closed contacts GG—5, relay magnet Yu, to line 381.

With a zero in the tens order, a parallel circuit would be similarly traceable to energize the Yt magnet and similarly for the energization of the Yh magnet if a zero occurred in the hundreds order. If the multiplier contains no zeros, these circuits will not be established.

It is to be noted that only three orders of the PMRO are effective to control the Y magnets inasmuch as, for the problem selected, only three SS magnets are energized, this being in accordance with the number of columns in the first multiplier group. Thus, only the digits relating to the first multiplier are tested for the presence of zeros at this time. The presence of zeros in other multiplier groups has no effect at this time and the other multipliers will be independently tested later in the operation of the machine for an independent setting of the Y relay magnets; that is, the SS relays at this time render only the orders of the MPRO containing the digits of the first multiplier subject to the testing devices.

The function of the Y relay magnets, as in the Daly patent, is to cause the multiplier mechanism to successively multiply by the significant digits in the multiplier without any intervening idle time for orders in which zeros occur. This is the well known cycle control function.

As usual, the Y magnets are provided with holding contacts Yu—1, Yt—1, etc., which maintain the circuits through such magnets as are energized from line 381, magnets Yu, Yt, etc., contacts Yu—1, Yt—1, etc., wire 714, wire 711, contacts M—2, I—CR—10, wire 440, to line 382 as before. Also, as usual, the Y magnets close related contacts Yu—2, Yt—2, etc., shown in Fig. 7a. Where there are no zeros in the first multiplier, these contacts will be in the position shown at the commencement of actual multiplying operations. Energization of M will have closed its relay contacts M—1 (Fig. 7a) so that near the end of the LH reset cycle cam contacts CC—2 will close and complete a circuit traceable from line 383, contacts CC—2, M—1, closed contacts Yu—2, column shift magnet CSu, through the now closed contacts I—SS—1 (closed due to energization of the relay magnet I—SS), through wire 716 to the units order common segment 263, the brush 264 to the segment spot 262 corresponding to the digit at which the brush is set, which for the problem shown in Fig. 8 is the "7" position, the "7" wire of the 394 group (Figs. 7b and 7c), to the X7 multiplying relay magnet, and thence to ground. Energization of magnet CSu will close its contacts CSu—3 (Fig. 7b) to establish a circuit from line 381, relay magnet Yu, contacts CSu—3, wires 714 and 711, contacts M—2 (now closed), contacts I—CR—10, wire 440 (Fig. 7f), contacts 274 to line 382. Magnet Yu closes its contacts Yu—1 to provide a holding circuit substantially as traced. This circuit is held until contacts I—CR—10 open after multiplying has been effected by all the digits in the first multiplier, as will be explained.

*First multiplying operation*

Energization of the X7 relay magnet will operate its related multiplying relay so that during the following cycle multiplying operations will take place in the usual manner; that is, at the proper time in the operation of the machine, current impulses flow from the emitter 265 (Fig. 7c) through the multiplying relay control contacts. Such impulses flow over the lines generally designated 397LH and 397RH to the LH and RH sections of the multiplicand readout MCRO. The multiplicand readout device allows selected impulses to flow to the LH component lines 398LH and to the RH component lines designated 398RH. The lines 398LH and 398RH (see Fig. 7d) extend down to the various contacts 131 of the CS relays, being wired as shown, and the other contacts 132 of these relays connect to the LH and RH wires 399LH and 399RH, which latter lines connect to the accumulator magnets 390RH pertaining to the RH accumulator. The wires 399LH extend through the normally closed relay contacts HH—1 to the LH accumulator magnets 390LH. These contacts HH—1 are introduced in the wires 399LH for the purposes of the present invention and when they are shifted, due to energization of their controlling coil HH, the wires 399LH are connected to the magnets 390SP of the SP accumulator. The conditions under which these contacts are shifted will be more fully explained later.

In the foregoing way, partial products are entered into the LH and RH accumulators and, as successive multiplying cycles ensue, there is a selected energization of the CS magnets to direct the entries into the proper and shifted-over orders of the accumulators. Thus, for the problem under consideration, where the first multiplier contains three significant digits during the second multiplying cycle, the column shift magnet CSt is energized and controls multiplying of the MC amount by the tens digit of the multiplier and the entry of the partial products into the LH and RH accumulators. Following this, the CSh column shift relay magnet is energized, causing multiplication of the MC amount by the hundreds order multiplier digit and the appropriate entries of the partial products into the LH and RH accumulators.

Associated with each of the multiplying relays X1 to X9 is an added pair of contacts designated X—1a, X—2a, etc., which close when the multiplying relay is energized. Thus, for the first multiplying cycle, when the X7 relay is energized, the contacts X—7a are closed and will complete a circuit during the first multiplying cycle when cam contacts CC—II close, which is traceable from line 382 (Fig. 7b), wire 707, contacts CC—II, contacts X—7a, relay magnet GG, wire 710, to line 381. Magnet GG closes its contacts GG—9 to establish a holding circuit from line 381, wire 710, magnet GG, contacts GG—9, contacts CC—III, to line 382. Relay magnet GG shifts its contacts GG1—4 and GG5—8 from the position shown in Fig. 7b for the purpose of testing whether multiplying operations for the first mulitplier group are completed. Since, as explained, the first multiplier may have a variable number of orders, this completion of multiplying may occur after any one of the multiplying cycles. Energization of magnet GG at this time is of no effect and, when contacts CC—III open before the end of the cycle, the related contacts return to the positions shown in the wiring diagram.

*Second multiplying operation*

Magnet Yu which was energized during the first multiplying operation also shifted its contacts Yu—2 (Fig. 7a) so that subsequent closure of contacts CC—2 will complete a circuit to select the multiplying relay related to the tens digit of the multiplier which in this case is 3. The circuit follows from line 383, contacts CC—2, M—1, left-hand contacts Yu—2 (now closed), left-hand contacts Yt—2, column shift magnet CSt, left-hand contacts 2—RR—4, contacts 2—SS—1 (now closed, due to energization of relay magnet 2—SS), to the tens order common segment 263, the brush 264 to the segment spot 262 corresponding to digit "3", the "3" wire of the 394 group (Figs. 7b and 7c) to the X3 multiplying relay magnet and thence to ground. Energization of magnet CSt will close its contacts CSt—3 (Fig. 7b) to establish a circuit including relay magnet Yt which in turn closes its contacts Yt—1 to set up a holding circuit, the same as explained for magnet Yu. Magnet Yt also shifts its contacts Yt—2 (Fig. 7a).

The multiplying relay closes its contacts X—3a (Fig. 7b) to energize relay magnet GG when contacts CC—II close, but as in the preceding cycle and for the problem chosen such energization is of no effect at this time. Multiplying by the digit 3 proceeds to cause appropriate partial product entries in the accumulators.

*Third multiplying operation*

When the contacts CC—2 again close, a circuit is traceable from line 383, contacts CC—2, M—1, left-hand contacts Yu—2 and Yt—2 (now closed in series), right-hand contacts Yh—2, column shift magnet CSh, left-hand contacts 3—RR—3, 2—RR—5, contacts 3—SS—1 (now closed due to energization of relay magnet 3—SS), to the hundreds order common segment 263, the brush 264 to the segment spot 262 corresponding to digit "5," the "5" wire of the 394 group (Figs. 7b and 7c) to the X—5 multiplying relay magnet and thence to ground. Again, without tracing the now familiar circuits in detail, magnet CSh closes its contacts CSh—3 to cause energization of Yh which in turn closes its contacts Yh—1 to establish a holding circuit. Magnet Yh also shifts its contacts Yh—2 (Fig. 7a).

Multiplying relay X—5 closes its special contacts X—5a, so that magnet GG is energized through contacts CC—II and held through contacts CC—III as before and partial product entries take place in the well-known manner. In the present case, where there are three multiplying cycles, indicating three significant digits of the multiplier, the energization of the GG relay magnet will be effective at the end of the third multiplying cycle and the attendant shift of its related contacts will establish a circuit as follows upon closure of cam contacts CC—2: from line 383 (Fig. 7a), contacts CC—2, M—1, serially through the now shifted relay contacts Yu—2, Yt—2, Yh—2, wire 717 (Fig. 7b), the now shifted relay contacts GG—7, contacts 3—RR—1, 2—RR—2 in the position shown, right hand contacts GG—3, which are also closed on energization of magnet GG, left hand contacts 3—SS—2, through the non-shifted, closed contacts 4—SS—2, to the 1—CR relay magnet, and thence to ground.

The effect of energization of relay magnet 1—CR is to initiate a cycle of operation during which the RH components are transferred from the RH accumulator to the LH accumulator to combine the partial products to form the complete product.

To further illustrate the selective energization of relay 1—CR, let it be assumed that the first multiplier contained only two digits. In such case, only the relay magnets 1—SS and 2—SS will be energized with a consequent shifting of the related contacts. In such event, upon the completion of multiplying by the two digits with the consequent energization of the Yu and Yt relay coils and the energization of the relay magnet GG, a circuit, similar to that just traced, would be established through the shifted contacts Yt—2 in Fig. 7a to the wire 718 (Fig. 7b), thence through the right hand contacts GG—6, left hand contacts 2—RR—1, right hand contacts GG—2, left hand contacts 2—SS—2, thence serially through the right hand contacts 3—SS—2, 4—SS—2 to the relay coil 1—CR. Accordingly, the initial setting of the SS contacts, together with the energization of the Y magnets and shifting of the GG contacts, will cause energization of the 1—CR relay magnet after multiplying cycles are completed for a given MP amount irrespective of the number of the MP columns.

*RH to LH transfer cycle*

Figure 7E:
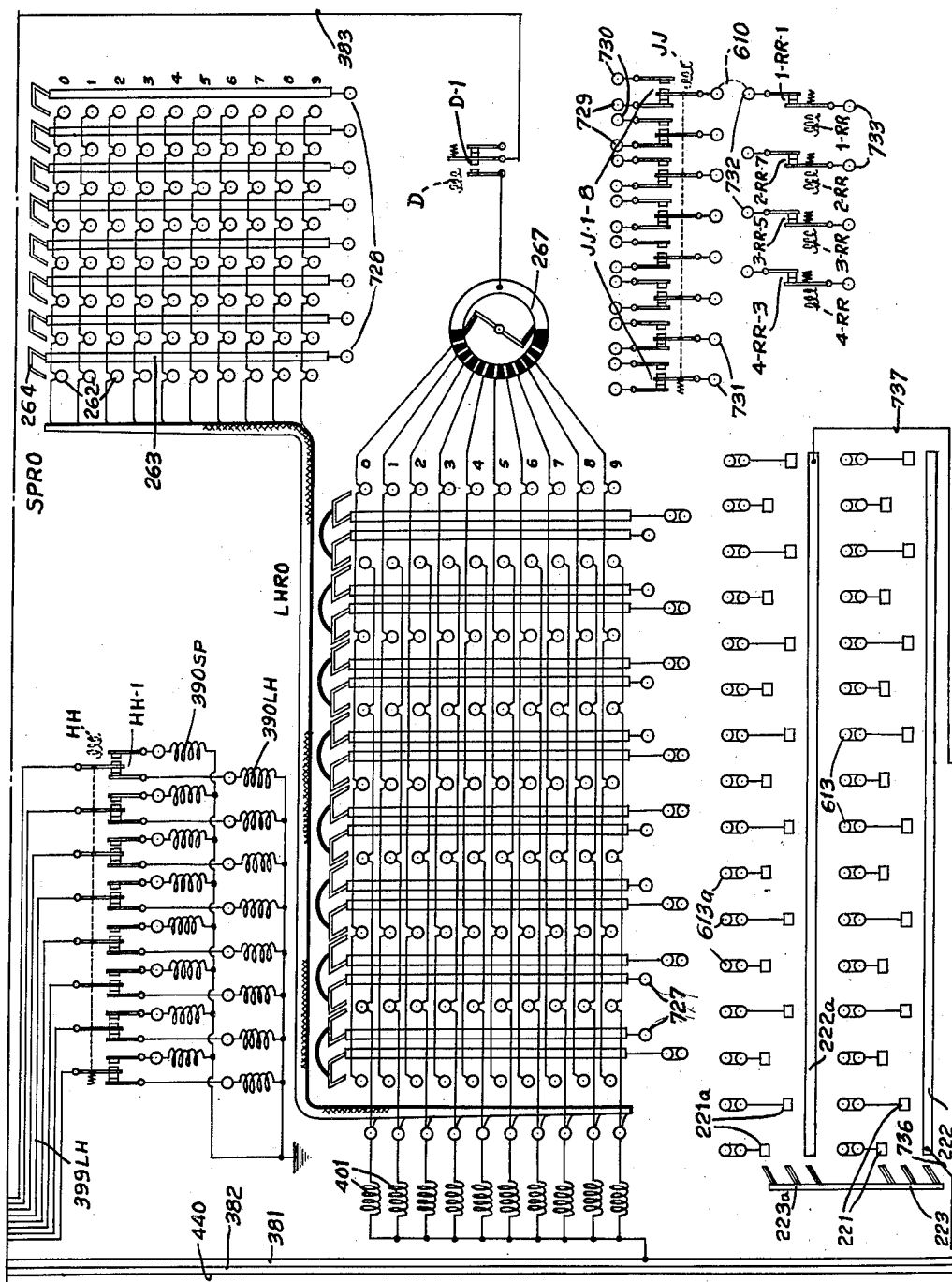

Transfer of the RH amount to the LH accumulator is effected substantially as in the Daly patent, except that as pointed out above, the contacts HH—1 of Fig. 7e are included in the transfer circuit. This transfer operation is permitted by the energization of the relay 1—CR which permits closure of the related contacts 1—CR1—8 (Fig. 7d) which connect the RHRO readout with the 399LH lines. Accordingly, upon the operation of emitter 265, impulses are emitted through a group of wires 430 (Figs. 7c and 7d) to and through RHRO to the 1—CR1—8 contacts, wires 399LH, left hand contacts HH—1, to the LH accumulator magnets 390LH. The amount previously standing on the RH accumulator is entered into the LH accumulator in proper columnar relation.

The 1—CR relay magnet causes shifting of additional contacts for the performance of other functions, which will now be explained. In Fig. 7b, a pair of contacts 1—CR—10 is opened to interrupt the holding circuit for the M and N, and also the Y magnets to break down the setup of the cycle controller.

*RH and SP reset cycle*

During this cycle, the RH and SP accumulators are concurrently reset. The resetting of the SP accumulator will initiate multiplying operations for the second multiplier group, and a punching operation to punch the product just obtained in the LH accumulator back on the card is also initiated and takes place during the reset of the accumulators and during the subsequent computing cycles. Reset of the RH and SP accumulators is brought about as follows:

Late in the previous cycle, at the completion of the RH to LH transfer cycle, the brush of emitter 265 encounters the extra contact spot and completes the circuit from line 383 (Fig. 7c), through the emitter 265, relay contacts I—CR—II, which are closed at this time, wire 718 (Figs. 7b and 7a), normally closed relay contacts L—3, RH reset magnet 392RH, to ground. From contacts L—3 a parallel circuit extends through wire 719, through left hand contacts I—TT—4, wire 720, upper contacts BB—2 which are now closed since relay magnet BB is still energized at this time, SP reset magnet 392SP, to ground. The RH and SP accumulator magnets accordingly reset in the usual manner.

During resetting of the SP accumulator, contacts SP—I (lower right hand corner of Fig. 7b) close, causing energization of relay magnet I—TT through a circuit traceable from line 382, wire 707, through contacts BB—4, SP—I, wire 721, relay magnet I—TT, and back to the line 381. I—TT closes its contact I—TT—I, providing a holding circuit for I—TT from line 381, through magnet I—TT, contacts I—TT—I, wire 722, to wire 440 (Figs. 7b, 7c, 7d, 7e, and 7f), through MC reset contacts 274, to line 382. Energization of relay magnet I—TT shifts its contacts I—TT—3 (Fig. 7b) to break the circuit through the I—RR and I—SS to 3—SS relay magnets and at the same time, due to closure of the upper pair of contacts I—TT—3, causes energization of the relay magnet 4—RR and magnet 4—SS. These circuits are traceable as follows: from line 382, through wire 707, contacts BB—4, upper contacts I—TT—3, lower contacts 2—TT—3, #2 plug socket 700, plug connection 706, #4 socket 702, relay magnet 4—RR, wire 710, to line 381. From #2 plug socket 700 the circuit branches through the plug connection 704, #4 plug socket 701, relay magnet 4—SS and wire 710 to line 381. Energization of relay magnet 4—RR shifts its contacts 4—RR—2 (Fig. 7a), thereby connecting the units column shift magnet CSu through the right hand contacts 4—RR—2 and the now closed contacts 4—SS—I and the lowermost wire 716 to the order of the MPRO device containing the second multiplier. Also, the closure of the contacts 4—SS—3 (Fig. 7b) and closure of the right hand contacts 4—RR—I will associate the thousands order column of the MPRO containing the second multiplier with the relay magnet Yu.

During the resetting of the SP accumulator, its related contacts SP—4 (Fig. 7f) close, completing a circuit from line 382, through the now closed contacts BB—5, contacts SP—4, relay magnet HH, to line 381. Magnet HH closes its contacts HH—9, providing a holding circuit from 381, magnet HH, contacts I—HH—9, contacts RH—I, which will have opened and be closed again at this time, back to line 382. Magnet HH shifts its contacts HH—I in Fig. 7e to the position such that the wires 399LH are connected to the accumulator magnets 390SP so that during the next computation the left hand partial products will be entered into the SP accumulator instead of the LH accumulator as before.

Also, during this cycle, the closure of reset contacts RH—2 (Fig. 7f) will complete a circuit from line 382, contacts RH—2, relay magnet B, to line 381. Contacts B—2 providing a holding circuit from line 381, contacts B—2, normally closed contacts EE—4 lower reset contacts 271 of the LH reset, to line 382. Relay magnet B also closes its contacts B—I to initiate punching operations. The detailed explanation of the punching mechanism will be deferred until the computing cycles, which take place concurrently therewith, have first been described.

The closure of RH reset contacts RH—3 (Fig. 7f) causes energization of the relay magnet L through the switch 601 which is in the position shown. The relay magnet closes its contacts L—I to provide a holding circuit through wire 401 and the MC reset contacts 274. Relay magnet L opens its contacts L—3 in Fig. 7a, preventing the hereinabove traced circuits for energization of the reset magnets 392RH and 392SP from being further effective.

*Second multiplying operation*

The machine is now ready to proceed to multiply the MC amount by the second multiplier, which, for the example chosen, is a single digit. Closure of SP reset contacts SP—3 (Fig. 7b) near the end of the previous cycle caused energization of the relay magnets M and N in the same manner as the LH reset contacts 270 already explained so that, with relay contacts M—I closed, the closure of cam contacts CC—2 will complete a circuit traceable from line 383 (Fig. 7a), contacts CC—2, M—I, right hand contacts Yu—2, column shift magnets CSu, right hand relay contacts 4—RR—2, left hand contacts 3—RR—4 and 2—RR—6, now closed relay contacts 4—SS—I, lowermost wire 716, thousands order common strip 263 of MPRO, through the brush 264, through the segment spot at which the brush stands, out via, say, the "9" wire of group 394 (Figs. 7a, b, and c) to the X9 multiplier relay magnet, to ground. The subsequent closure of the X9 relay contacts will permit partial product impulses to be created, which impulses will flow, as described hereinbefore, to the 390RH accumulator magnets (Fig. 7d) and through the now shifted H—I relay contacts (Fig. 7e) to the 390SP accumulator magnets.

It will be noted particularly that, due to the energization of the units column shift relay magnet CSu, the partial products entries are directed to the lowest denominational orders of the LH and SP accumulators; that is, in effect, the second multiplier, even though it appears in the thousands order of the multiplier receiving device, has a units order denominational order characteristic.

The energization of the X9 multiplier relay, in addition to closing its regular contacts, closes the extra X9a contacts (Fig. 7b). During this multiplying cycle, when cam contacts CC—II close, the relay coil GG is energized, as previously described, and it is maintained energized through its stick contacts GG—9 and the cam contacts CC—III. The energization of relay coil GG shifts its associated contacts GG—I to 4 and GG—5 to 8. During this same multiplying cycle, the Yu cycle controller coil becomes energized upon closure of the column shift relay contacts CSu—3. The energization of Yu closes its stick contacts Yu—I to maintain Yu closed through the stick circuit, as previously described. The energization of Yu also shifts its related transfer contacts Yu—2 to reverse position from that shown. With the GG relay contacts shifted and the Yu2 contacts in reverse position, when cam contacts CC—2 close near the end of the multiplying cycle, a circuit is established from line 383, cam contacts CC—2, relay contacts M—I now closed, the shifted Yu—2 contacts, wire 725 (Figs. 7a and 7b), the now shifted GG—5 contacts over wire 726, the now shifted 4—RR—I relay contacts, the non-shifted 3—RR—2 and 2—RR—3 relay contacts, the now closed right hand GG—4 contacts and left hand 4—SS—2 contacts to and through the I—CR relay coil to ground.

Plugging for punching

The plug connections for controlling the proper distribution of the punch controlling circuits will now be explained with particular reference to Fig. 9 in which the several units involved are diagrammatically represented to show the manner in which they are selectively interconnected. The LHRO unit is provided with the usual readout sockets 727; the SPRO unit has a corresponding set of readout sockets 728. The punch reading strips are shown in part with the sockets 613 and the auxiliary sockets 613a which are to be associated with the product receiving fields of the card. A relay unit comprising contacts JJ—I to JJ—8 controlled by a relay magnet JJ, is shown with sets of sockets 729, 730, and 731 wired to the contact blades. A further relay unit, containing four normally closed relay contacts I—RR—I, 2—RR—7, 3—RR—5, and 4—RR—3, is wired to plug sockets 732 and 733 as shown. Plug connections 606 are made between the sockets 727 of the LHRO and sockets 729 of the JJ relay unit. Corresponding connections are made between the sockets 728 of SPRO and sockets 730. From the sockets 731, connections are made, as shown, to the reading strip sockets 613, through connections 608 and 609. The connections 608 and 609 are made to the sockets 613 corresponding to the columns of the card which are to receive the lowest order digits for the problem chosen. These connections are made in accordance with the size of the factors involved and are dependent upon the number of digital positions in the largest possible product. Thus, for a four place multiplicand and two multipliers of one and three places respectively, the largest possible product will require seven places so that seven sockets 731 are connected to seven sockets 613 in each product receiving position of the card to be punched. All sockets 731 except that in the highest order are directly connected to the correspondingly ordered sockets 613 by direct connections 608 and 609 in positions related to both product receiving fields of the card. A plug connection 610 is made between the socket 731 in the seventh position from the right which is the highest order position in which a product digit can be obtained for a computation involving factors of four and three places respectively. This connection is made to the #1 socket 732 and an additional plug connection 611 is made from the companion socket 733 to the socket 613 related to the column in which the highest possible order digit of the first product is to be punched.

From this same socket 613, a plug connection 612 is made to the #4 socket 732. The selection of sockets 732 to receive the connections 612 and 610 is made to correspond to the selected plug sockets 702 (Fig. 8a); that is, if the #1 and #4 sockets 702 are utilized, the #1 and #4 sockets 732 will also be plug connected. From the #4 socket 733, a plug connection 612a is then made to the plug socket 613 corresponding to the first punching position of the second product field.

There is provided a special socket 615 from which a plug connection 734 is made to the plug socket 613a corresponding to the column of the card in which the units digit of the first product is to be punched and from this socket, a further connection 735 is made to the socket 613a corresponding to the column of the card in which the units digit of the second product is to be punched. The manner in which the machine automatically punches the products will now be set forth in detail with particular reference to the plugging arrangement just described.

Punching operation

It was mentioned above that, upon completion of computing the first product amount, and during the subsequent reset of the RH and SP accumulators, relay coil B became energized. The holding circuit for B was described at that point. The energization of coil B also effected closure of relay contacts B—I (Fig. 7f). It will be understood that at this time the first column of the field which is to receive the first product is in position under the row of punches and that the brushes 223 and 223a are also in that position, connecting the corresponding readout spots 221 and 221a with their common segments 222 and 222a respectively. Upon closure of relay contacts B—I a circuit is established from line 382 (Fig. 7f), through relay contacts B—I, escapement contacts 215, switch 401, upper contacts 386a, switch 405, wire 736 (Fig. 7e) to the common segment 222. A parallel circuit extends from contacts B—I (Fig. 7f) through a wire 737 (Fig. 7e) to the common segment 222a. In this manner, both common segments are electrically connected to the right side of line 382. From the common segment 222, the circuit will continue (see Fig. 9) through the brush 223 to segment 221 of column 15, plug connection 611 to sockets 733, thence through contacts I—RR—I, which are now closed, to socket 732, plug connection 610, to socket 731, through the appropriate JJ contact, to socket 729, and plug connection 606 to the appropriate socket 727 in the LHRO device. From here the circuit continues through the LHRO unit in the position corresponding to the setting of the readout brush, thence to the appropriate punch selecting magnet 401 and to line 381. As usual, the punch selecting magnet 401 causes closure of punch contacts 408 (Fig. 7f) which, in turn, complete the circuit through the punch operating magnet 409 in the well known manner to effect punching and at the same time open escapement contacts 215 to break the punch selecting magnet circuit and also permit the card to advance to present the next column to the row of punches. In this column, a circuit similar to that just traced will be repeated, with the exception that no RR contacts are involved, the circuit extending in part from the common conducting strip 222 (see Fig. 9) to the brush 223, segment 221, plug connection 609, 608, to the appropriate JJ contacts, plug connections 606, and through the LHRO device in the usual manner. In this way, the several columns of the first product field are punched in succession. After the last or units column of the first product field has been punched and as the card carriage automatically escapes from this position, the auxiliary escapement contacts 215a (Fig. 7f) will close to complete a circuit which is traceable from line 382 (Fig. 7f), contacts B—I, wire 737, common segment 222a (see also Fig. 9), brush 223a, segment 221a in column 21, corresponding plug socket 613a, plug connection 734, to plug socket 615 (Fig. 7f), thence through contacts 215a, relay magnet EE, to line 381. Consequent closure of contacts EE—I provides a holding circuit from line 381, magnet EE, contacts EE—I and RH—I, to line 382.

The step-by-step punching of the first product takes place while the RH and SP resetting operations and the multiplying operations for the second multiplier take place, as above described.

Energization of relay magnet 1—CR has again shifted the contacts 1—CR1—8 (Fig. 7d) to connect the RH readout device to the wires 399LH. Since at this time, however, the HH relay magnet is energized and its right hand contacts HH—1 (Fig. 7e) are closed, the transfer circuits, which need not again be specifically traced, will direct the RH amount into the SP accumulator in proper denominational allocation so that the second product is now contained in the SP accumulator. Since the operation of punching, which takes place concurrently with these computing operations, may extend over an indefinite period depending upon the number of columns to be punched, the first product field may be completely punched before computing is completed or may extend beyond the time taken by the computing mechanism. If punching has been completed before computing is finished, the machine will automaticaly enter the next cycle of operations to reset the RH and LH accumulators and immediately commence punching of the second product. If punching has not been completed, the machine simply waits until the last column of the first product has been punched before entering upon the next cycle of operations. Again energization of magnet 1—CR opens its contacts 1—CR—10 (Fig. 7b) to break down the cycle controller setting by deenergizing the magnets M and N and such Y magnets that may have been set up during prior computing operations. Magnet 1—CR also closes its contacts 1—CR—9 (Fig. 7f) to energize relay magnet FF when cam contacts CC—I close. Coil FF closes its contacts FF—1 to provide a holding circuit therefor through contacts RH—1.

If punching of the first product has been completed, the relay magnet EE will have been energized in the manner explained and its contacts EE—2 will be closed so that relay coil DD can be energized through a circuit extending from line 381, magnet DD, contacts EE—2, FF—1 and RH—1 to line 382. Coil DD closes its contacts DD—1 to provide a holding circuit through RH—1. The three magnets EE, DD, and FF and their related contacts constitute an interlocking arrangement whereby the punching and computing operations are coordinated. Specifically, when punching is completed, magnet EE is picked up and, when computing and transferring are completed, magnet FF is picked up, and it is evident that one operation can be completed before the other operation, but the relay coil DD will not be picked up until both operations are completed. The circuits involved when punching is completed first have been traced.

If computing had been completed first, magnet FF would have been picked up upon closure of contacts 1—CR—9, as explained, but since, as assumed, punching is not yet completed, contacts EE—2 are open so that DD is not picked up at this time, but will wait until magnet EE is energized and at that time, closure of contacts EE—2 will effect energization of magnet DD.

Energization of relay magnet DD closes its contacts DD—2 (Fig. 7a) and at the time of closure of contacts CC—2, a circuit is completed from line 383, contacts CC—2, DD—2, wire 719, through RH reset magnet 392RH. A parallel circuit extends from contacts DD—2 to right hand contacts 1—TT—4, which are now closed, left hand contacts 2—TT—4, upper contacts BB—3, which are now closed, to the LH reset magnet 392LH. In this manner, the RH and LH accumulators are concurrently reset.

In Fig. 7b is shown a pair of contacts DD—3 which are also closed by the magnet DD, one blade of which is wired to plug socket 709 from which the plug connection 708 extends to the plug socket 701 related to the last, or left hand, SS relay coil of the final MP group (see also Fig. 8a). In the present case, this last socket relates to the second multiplier group and, as previously explained, the magnet 4—SS has been energized and a holding circuit therethrough extends to and through plug connection 704, the lower contacts 2—TT—3, the upper contacts 1—TT—3, and back to line 382, as previously traced. At this time, upon closure of cam contacts CC—IV, a circuit extends from line 381, through the wire 707, to #4 plug socket 701 as for the holding circuit traced, thence through plug connection 708, to socket 709, contacts DD—3, CC—IV, multiplicand reset magnet 392MC, to line 381. A parallel circuit extends from contacts CC—IV, through contacts FC—10, switch 395, MP reset magnet 392MP, switch 396, to line 381. In this manner, both the MC and MP reset magnets are energized to effect resetting of the accumulators at this time.

If the problem involved had included three separate multiplications, this credit would not be completed at this time, but would wait until the last effective SS relay magnet had been energized. At this point in the operation of the machine, resetting of the RH, LH, MP, and MC accumulators has been initiated and the second product is standing on the SP accumulator.

During the resetting operation, the product standing in the SP accumulator is punched. This punching operation is effected in the following manner.

During the resetting of the RH accumulator, contacts RH—4 close at the time indicated in Fig. 3, completing a circuit traceable on Fig. 7b from line 382, wire 707, contacts RH—4, contacts 4—TT—5, right hand contacts 3—TT—5, contacts 2—TT—5 and left hand contacts 1—TT—5 to energize relay coil J, wire 710, back to line 381. Coil JJ closes its contacts JJ—9 to provide a holding circuit which extends back to the line 382 through the now closed relay contacts EE—3, to wire 707, to line 382. Magnet JJ shifts its contacts JJ1—8 (in Figs. 7e and 9) to connect the readout sockets 728 of the SPRO device to the punching mechanism. Shortly thereafter, contacts RH—2 (Fig. 7f) close to energize the relay magnet B, as previously explained. The closure of the related contacts B—1 initiates punching operation of the second product. This initiation is dependent upon the closure of the 4—RR—3 relay contacts. This is effected upon deenergization of the relay coil 4—RR. Concurrently with this deenergization, the 4—SS relay coil is deenergized.

The closure of the LH—3 reset contacts (Fig. 7b) during the reset of the LH receiving device, completes a circuit from the relay contacts BB—4 still closed, through a wire 740, to and through now closed 1—TT—2 relay contacts to energize the 2—TT relay coil. The return circuit for this coil is back to the 381 side of the D. C. line. Such energization of 2—TT causes the 2—TT—3 relay contacts to shift to a reverse position from that shown, thus causing the deenergization of the 4—RR and 4—SS coils. With the contacts 4—RR—3 closed, the first punching circuit can now be completed and may be traced on Fig. 9 from the SPRO plug sockets 728 of the highest order position, to the right hand JJ contacts, to plug connection 610, the closed 1—RR—1 contact, plug connection 611, plug connection 612, closed contacts 4—RR—3, plug connection 612a, to the socket 613 in the first column of the second product, and from this point back to line as previously traced. This interlock through the 4—RR—3 contacts is for the purpose of initiating punching of the second products result only after the result is completed and the partial products gathered together.

Later in the cycle, after the circuits for controlling the punching of the first column of the product field have been completed, the MC reset contacts 274 (Fig. 7f) open to break the holding circuit through the relay coil BB (Fig. 7b) and also the holding circuits for the TT coil and coil L so that these are now deenergized. The closure of the 273MC reset contacts effects energization of relay coil C. The energization of this coil closes its holding contacts C—2 as previously described and also closes its related contacts C—1 to energize the card feed clutch magnet 384.

In the cycle following the resetting of the receiving devices hereinbefore described, a card feed cycle takes place to traverse the next card past the analyzing brushes 109 and enter the new factors into the MP and MC receiving devices. It will be understood that punching of the final result, in this instance the second product result, not only is initiated and takes place during the reset cyle just described, but also can extend, if necessary, and overlap into the card handling cycle. From this point on, punching continues until the second product is completely punched and the card has been advanced to the last column from which it is ejected. Thereupon, computing operations are initiated for the following record card in the manner described hereinabove.

When the last or units column of the second product is in punching position, a circuit is completed from the plug socket 613a in column 28, through the plug connections 735, 734, to the plug sockets 715 (see also Fig. 7f) to complete the circuit through the EE relay magnet. The magnet opens its contacts EE—3 in Fig. 7b to deenergize the relay magnet JJ, permitting the related contacts to disconnect the SPRO device and re-connect the LHRO device to control punching. Magnet EE also opens its contacts 77—4 in Fig. 7 to de-energize the relay magnet B.

*Operation with three multipliers*

The operation of the machine, when it is conditioned to effect multiplication of a 5 place multiplicand by each of three successive, single digit multipliers in succession, will now be explained. The preliminary plug connections are made as shown in Figs. 10 and 11. Since the product of a 5 place multiplicand and a single multiplier will result in a 6 place product as a maximum, six plug connections 606 and 607 are made from the readout sockets 727 and 728 of the LHRO and SPRO devices respectively and connected as shown to six pairs of sockets 729, 730. In Fig. 11 three plug connections 705 are made from the first three sockets 700 to the correspondingly numbered sockets 702, the number of connections made being determined by the number of multipliers to be used. Parallel connections 703, 703a and 703b are also made from the three sockets 700 to the correspondingly numbered sockets 701, and a further connection 708 is made from the highest connected socket 701 to socket 709.

In Fig. 10 the five sockets 731 relating to the five right-hand pairs of sockets 729, 730 are plug connected through connections indicated at 608, 609 to plug sockets 613 corresponding to the positions on the card to be punched, in which the five right-hand digits of each of the products are to be recorded. The socket 731 in the sixth position is connected through a plug connection 610 to the "1" socket 732 whose companion socket 733 has a plug connection 611 to the socket 613 farthest to the left. This socket in turn through connection 612 is connected to the "2" socket 732 whose companion socket 733 is connected through connection 611a to the socket 613 relating to the column of the card in which the sixth position digit of the second product is to be punched. This socket in turn is also connected through a plug connection 612a to the "3" socket 732 whose companion socket 733 is connected through a plug connection 611b to the socket 613 in which the sixth position digit of the third product is to be punched. The sockets 613a related to the three card columns in which the units order digits of the three products are to be punched are connected together by connections 735 and 735a and through connection 734 to the plug socket 615.

The sequence of operations will now be explained with reference to the circuit diagram and also to Fig. 4 in which the operations involved in handling a succession of three multiplying operations is represented.

During the first two cycles of operation which constitute a single card feed cycle, the record card containing the multiplicand and three separate multipliers is advanced to pass the sensing brushes and the multiplicand is entered into the MC device and the three multipliers are entered into the three digital sections of the MP device, one multiplier digit being entered into each of the units, tens and hundreds positions. The card then passes through the punching mechanism and the usual preliminary resetting operations are initiated to reset the LH accumulator. This resetting takes place in the third cycle during which the card is advanced to present the first column in which punching is to be effected beneath the row of punches. The operations up to this point have already been explained in detail and are therefore not repeated.

During the resetting of the LH accumulator, the contacts 270 (Fig. 7b) close to effect energization of the relay magnets M and N, and closure of the LH reset contacts LH—1 effects energization of relay magnet BB. Magnet BB is energized and its contacts BB—4 are closed to complete a circuit from line 382, wire 707, contacts BB—4, normally closed contacts 1—TT—3 to the number "1" socket 700 which for the present set-up is connected to the number "1" socket 702, continuing the circuit through the relay magnet 1—RR, wire 710, to line 381. A parallel circuit also extends from the number "1" socket 700 to the number "1" socket 701 (see Fig. 11) and thence through relay magnet 1—SS and wire 710 to line 381. The effect of energization of relay magnet 1—SS is to connect the units order section of the MPRO device to the cycle controlling mechanism leaving the remaining orders disconnected therefrom. More specifically, the common conductor 263 (Fig. 7a) in the units order of the MPRO device is electrically connected to the units cycle controlling magnet Yu.

It may be pointed out at this time that, where a plurality of multipliers is concerned in any particular setting of the machine, each card in the run of cards for such setting will have a significant multiplier for each of the plurality, that is, if the machine is conditioned for two successive multiplications, each card will have two multipliers, and if the machine is conditioned to obtain three successive products, each card will have three multipliers. For the problem under consideration where the three multipliers each contain only a single digit, there will be no elimination of multiplying cycles, since each of the three multipliers will be represented by a single significant digit.

*Fourth cycle.*—With relay magnet M energized, the closure of contacts CC—2 near the end of the third cycle will complete a circuit from line 383 (Figs. 7a), contacts CC—2', contacts M—I, non-shifted contacts Yu—2, relay magnet CSu, contacts now closed, wire 716 to the units I—SS—I order conductor 263 to the wire 394 corresponding to the multiplier digit for which the brush 264 in this column is set, thence to one of the multiplying relay magnets XI to X9 (Fig. 7c) and thence to ground. With one of the multiplier relays energized, the emitter 265 (Fig. 7c) will send impulses through the multiplying relay contacts, wires 397LH and 397RH to and through the MCRO device, thence through wires 398LH, 398RH, contacts 131, 132 of the CSu relay which is now energized and through wires 399RH to enter the right hand partial products in the RH accumulator. Circuits also follow through the wires 399LH (Fig. 7e) and through normally closed contacts HH—I to the magnets 390LH of the LH accumulator. Thus, the partial products of the multiplicand times the first multiplier are entered into the LH and RH accumulators in the usual manner. During this cycle, the selected multiplying relay XI to X9 will hold closed a pair of contacts X—Ia to X—9a (Fig. 7b) so that, when cam contacts CC—II close during the cycle, a circuit is completed from line 382 to cam contacts CC—II, the selected contacts X—Ia to X—9a, relay magnet GG, wire 710 to line 381. Magnet GG closes its contacts GG—9 to provide a holding circuit for the magnet through cam contacts CC—III.

As stated above, a circuit completed through the selected multiplying relay includes the column shift magnet CSu (Fig. 7a). This magnet closes a pair of contacts CSu—3 (Fig. 7b) which complete a circuit from line 381, through the relay magnet Yu, contacts CSu—3, wires 714, 711, contacts M—2 now closed, normally closed contacts I—CR—10, wire 440, normally closed contacts 274 (Fig. 7f) to line 382. Magnet Yu closes its contacts Yu—I to provide a holding circuit substantially as traced with the Yu—I contacts in parallel with the CSu—3 contacts. Magnet Yu also shifts its contacts Yu—2' (Fig. 7a) and magnet GG has shifted its contacts GG—I and GG—5 so that with these contacts shifted, a circuit will be completed, during the fourth cycle when cam contacts CC—2 (Fig. 7a) close, which is traceable as follows: from line 383, contacts CC—2, contacts M—I, left-hand contacts Yu—2 now closed, wire 725 (Fig. 7b), right-hand contact GG—5 now closed, right-hand contact GG—I now closed, left-hand contacts I—SS—2 which are still closed and thence serially through the non-shifted contacts 2—SS—2', 3—SS—2, 4—SS—2, relay magnet I—CR to ground. Thus, after the single multiplying cycle of operations the magnet I—CR which controls the transfer from the RH accumulator to either the LH or SP accumulator is effected.

*Fifth cycle.*—Magnet I—CR opens its contacts I—CR—10 (Fig. 7b) to break the holding circuit through relay magnets M and N and also through Yu. The magnet also closes its contacts I—CRI—8 (Fig. 7d) to direct the transfer circuits from the RHRO device to wires 399LH and through the normally closed contacts HH—I (Fig. 7e) to the LH accumulator magnets 390LH. Thus, in the usual manner the RH partial products are entered into the LH accumulator to accumulate the product of the multiplicand times the first multiplier. In this cycle at the completion of the RH to LH transfer, the brush of emitter 265 (Fig. 7c) completes a circuit through the reset magnet 392RH which is traceable from line 383, emitter 265, contacts 265, contacts I—CR—II, wire 718 (Figs. 7b and 7a), normally closed contacts L—3, reset magnet 392RH to ground. From contacts L—3 a parallel circuit extends through left-hand contacts I—TT—4, wire 720, upper contacts BB—2 which are now closed, magnet 392SP to ground. The RH and SP accumulators will therefore reset in the next cycle during which punching of the first product under control of the LH accumulator will also take place.

*Sixth cycle.*—As stated, the RH and SP accumulators reset during this cycle and closure of contacts SP—I (Fig. 7b) will energize relay magnet I—TT through a circuit traceable from line 381, magnet I—TT, wire 721, contacts SP—I, contacts BB—4, still closed, wire 707 to line 382. Magnet I—TT closes its contacts I—TT—I to provide a holding circuit through wire 722 and wire 440 which, as explained, is connected to the line 382 through the MC reset contacts 274 (Fig. 7f). The opening of the lower contacts I—TT—3 (Fig. 7b) will effect deenergization of relay magnets I—RR and I—SS and will enable completion of the circuit from line 382, wire 707, contacts BB—4, upper contacts I—TT—3, lower contacts 2—TT—3, to the number "2" socket 700. In Fig. 6 this socket is connected to the number "2" sockets 701 and 702 so that the circuit will continue to these sockets and thence through the relay magnets 2—RR and 2—SS in parallel. The magnets 2—RR and 2—SS effect a realignment or reassociation of the sections of the MPRO device and the cycle controlling mechanism which will be effective during the next multiplying cycle after punching of the first product has been effected. During this sixth cycle the relay magnet L (Fig. 7f) is energized and also the relay magnet B, which latter magnet closes its contacts B—I to initiate punching operations. Contacts B—I establish a circuit from line 382 (Fig. 7f) through relay contacts B—I, escapement contacts 215, switch 401 in the position shown, upper contacts 386a, switch 405, wire 736 (Fig. 7e) to the common segment 222. A parallel circuit extends from contacts B—I through a wire 737 (Fig. 7e) to the common segment 222a. From the common segment 222 a circuit will continue (see Fig. 10) through brush 223 to segment 221 of column 15, plug connection 611, to the number "1" socket 733, thence through contacts I—RR—I, to socket 732, plug connection 610, socket 731, in the sixth position, through the appropriate JJ contacts, socket 729, connection 606, to the appropriate socket 727 of the LHRO device. From here the circuit continues through the LHRO device in the position corresponding to the setting of the readout brush and thence to the appropriate punch selecting magnet 401 and thence to line 381. The punching thereupon takes place in the usual manner with the accompanying escapement of the card to present the next column to the row of punches. In this column a circuit similar to that just traced will be repeated with the exception that no RR contacts are involved. After the last or units column of the first product field has been punched and as the card carriage automatically escapes from this position, the auxiliary escapement contacts 215a (Fig. 7f) close to complete a circuit from line 382, contacts B—I, wire 737, common segment 222a (see also Fig. 10), brush 223a, segment 221a in column 20, plug connection 134, socket 615 (Fig. 7f), contacts 215a, magnet EE to line 381. Contacts EE—I close to provide a holding circuit as before.

Assuming that the punching has been completed within the time required for this sixth or reset cycle, a multiplication of the multiplicand amount by the next multiplier will take place during the next succeeding cycle. During the latter part of this sixth cycle the relay magnets M and N are again energized due to closure of the SP—3 contacts (Fig. 7b) so that, when contacts CC—2 close at the end of a cycle, the selecting circuit for the next multiplying relay may then be completed. Also, toward the end of the cycle, closure of contacts SP—4 (Fig. 7f) will energize the relay magnet HH whose contacts HH—9 close to then complete the holding circuit through the reset contacts RH—I of the RH accumulator, thus shifting the contacts HH—I (Fig. 7e) so that the next following transfer cycle will direct the partial product from the RH accumulator to the SP accumulator. Closure of reset contacts RH—3 (Fig. 7e) effects energization of magnet L. Contacts L—I close to provide a stick circuit for magnet L which includes wire 440 and MC reset contacts 274. Energization of magnet L opens contacts L—3 (Fig. 7a).

*Seventh cycle.*—In accordance with the circuits explained hereinabove, the relay magnets 2—RR and 2—SS will be energized and their related contacts consequently shifted from the position shown in Figs. 7a and 7b and upon closure of contacts CC—2 a circuit will be traceable from line 383, contacts CC—2, contacts M—I, right-hand contacts Y$u$—2, relay CS$u$, right-hand contacts 2—RR—4, contacts 2—SS—I, the next second horizontal wire of the 716 group to the common conductor 263 in the tens order position of the MPRO device, thence in accordance with the setting of the brush in this order to one of the wires 394 and the appropriate multiplying relay magnet XI to X9 and to ground. The emitter 265 in its rotation will cause partial products of the multiplicand times the second multiplier to be entered into the RH and SP accumulators. Again, the relay magnet GG is energized upon closure of one of the contacts X—Ia to X—9a and will shift its contacts GG—5 and GG—2. As before, energization of magnet CS$u$ has closed its contacts CS$u$—3 to energize the cycle controlling magnet Y$u$ so that a circuit is traceable from line 383 through contacts CC—2, contacts M—I, left-hand contacts Y$u$—2, wire 725 (Fig. 7b), right-hand contacts GG—5, wire 726, right-hand contacts 2—RR—I now closed, right-hand contacts GG—2, left-hand contacts 2—SS—2 and thence serially through right-hand contacts 3—SS—2, 4—SS—2, magnet I—CR to ground. Magnet I—CR again opens its contact I—CR—10 to break the circuit through relays M and N and shift its contacts I—CRI—8 so that the transfer circuits may be completed.

*Eighth cycle.*—During this cycle the amount standing in the RH accumulator is transferred to the SP accumulator through circuits already traced. A circuit is completed to reset the RH accumulator and in this instance LH in lieu of SP. Closure of contacts I—CR—9 (Fig. 7f) effects through the closed (in sixth cycle) contacts EE—2 energization of magnet DD. Contacts DD—I close to maintain this magnet energized, the stick circuit extending through reset contacts RH—I. Contacts DD—2 (Fig. 7a) also close and near the end of this cycle cam contacts CC—2 close and a circuit is completed from line 382 through CC—2 and DD—2, through wire 719, right-hand contacts I—TT—4, which are now closed, left-hand contacts 2—TT, upper contacts BB—3 which are now closed, magnet 392LH to ground. It might be emphasized at this point that the BB relay magnet remains energized throughout the entire series of operations until the MC accumulator is reset.

*Ninth cycle.*—During this cycle the actual resetting of the RH and LH accumulators takes place and punching of the second product proceeds under control of the SP accumulator. Closure of contacts LH—3 (Fig. 7b) will cause energization of relay magnet 2—TT, the circuit being traceable from line 381, magnet 2—TT, contacts I—TT—2 which are now closed, wire 740, contacts LH—3, contacts BB—4, wire 707 to line 382. Magnet 2—TT closes its contacts 2—TT—I to provide a holding circuit which will be maintained until the MC accumulator is reset. The opening of contacts 2—TT—3 will result in deenergization of relay magnets 2—RR and 2—SS and will enable completion of the circuit from contacts BB—4 through upper contacts I—TT—3, upper contacts 2—TT—3, lower contacts 3—TT—3 to the number "3" socket 700. In accordance with the plugging arrangement of Fig. 11 in which this socket is connected to both the number "3" sockets 701 and 702, the 3—RR and 3—SS relay magnets will be energized at this time and will effect a realignment or reassociation of the sections of the MPRO device and the cycle controlling mechanism which will be effective during the next multiplying cycle after punching of the second product has been effected. During this cycle relay magnet B is energized and its contacts B—I initiate punching operations by establishing a circuit from line 382 (Fig. 7f), contacts B—I, escapement contacts 215, switch 401, upper contacts 386a, switch 405, wire 736 (Fig. 7a) to segment 222. A parallel circuit extends from contact B—I through wire 737 to the other common segment 222a. From segment 222 a circuit will continue (see Fig. 10) through brush 223 to segment 221 of column 21 which is the column in which the first digit of the second product is to be punched, plug connection 611a to the number "2" socket 733, contacts 2—RR—7 which are now closed, number "2" socket 732, connections 612, 611 to the number "1" socket 733, contacts I—RR—I now closed, number "1" socket 732, connection 610, socket 731 in the sixth position through the appropriate JJ contacts, socket 730, connections 607 to the appropriate sockets 728 of the SPRO device. Magnet JJ (Fig. 7b) becomes energized upon closure of RH—4 and shifts to a reverse position contacts JJI—8 (Figs. 7e and 10). Thus, SPRO is effective to control punching. From here the circuit continues through the SPRO device in the position corresponding to the setting of the readout brush and thence to the appropriate punch selecting magnet 401 and thence to line 381. Punching thereupon takes place in the usual manner with accompanying escapement of the card to present the columns in succession to the row of punches. Upon punching in the units order column and as the card automatically escapes from this punching position, the auxiliary escapement contacts 215a (Fig. 7f) close to complete a circuit from line 382, contacts B—1, wire 737, common segment 222a (see also Fig. 10), brush 223a, segment 221a in column 26, plug connections 734, 735, socket 615 (Fig. 7f), magnet EE to line 381. If punching has been completed before the end of the cycle, multiplying by the next multiplier will take place in the following cycle. During the latter part of this ninth cycle, the magnets M and N are again energized due to closure of contacts 270 so that, when contacts CC—2 close at the end of a cycle, the selected circuit for the next multiplying relay may then be completed. Also, during this cycle the contacts RH—1 (Fig. 7f) open to break the holding circuit through relay magnet HH so that its contacts HH—1 return to their normal position (Fig. 7e) and the next transfer from the RH accumulator will be to the LH accumulator.

*Tenth cycle.*—In accordance with the circuits explained hereinabove, the relay magnets 3—RR and 3—SS will be energized and their related contacts shifted from the positions shown in Figs. 7a and 7b and upon closure of contacts CC—2 the circuit will be traceable from line 383, contacts CC—2, contacts M—1, right-hand contacts Yu—2, relay magnet CSu, right-hand contacts 3—RR—3, left-hand contacts 2—RR—5, contacts 3—SS—1, to the common conductor 263 in the hundreds order position in the MPRO device, then in accordance with the setting of the brush in this order to one of the wires 394 and to the appropriate multiplying relay magnet X1 to X9 and thence to ground. The emitter 265 in its rotation will cause partial products of the multiplicand times the third multiplier to be entered into the RH and LH accumulators as for the first multiplying. Again the relay magnet GG (Fig. 7b) is energized upon closure of one of the contacts X—1a to X—9a and will shift its contacts GG—5 and GG—3. As before, energization of magnet CSu has closed its contacts CSu—3 to energize the cycle controlling magnet Yu, so that a circuit is traceable from line 383, through contacts CC—2, magnet M—1, left-hand contacts Yu—2, wire 725 (Fig. 7b), right-hand contacts GG—5, wire 726, right-hand contacts 3—RR—1 now closed, left-hand contacts 2—RR—2, right-hand contacts GG—3, left-hand contacts 3—SS—2 now closed, right-hand contacts 4—SS—2, magnet 1—CR to ground. Magnet 1—CR again opens its contacts 1—CR—10 to break the circuit through relays M and N and shift its contacts 1—CR1—8 so that the transfer circuits may be completed.

*Eleventh cycle.*—During this cycle the amount standing in the RH accumulator is transferred to the LH accumulator through circuits already traced and again the emitter 265 completes a circuit to reset the RH accumulator. Also in this cycle magnet DD (Fig. 7f) is energized upon closure of contacts 1—CR—9, traceable from line 382 to contacts CC—1, contacts 1—CR—9, contacts EE—2 (closed in ninth cycle), magnet DD to line 381. The magnet closes its contacts DD—1 to provide a holding circuit to contacts RH—1. The magnet also closes a pair of contacts DD—2 (Fig. 7a) and at the time of closure of contacts CC—2 a circuit is completed from line 383, contacts CC—2, DD—2, right-hand contacts 1—TT—4, right-hand contacts 2—TT—4, left-hand contacts 3—TT—4 which are now closed, upper contacts BB—2, magnet 392SP to ground. In this manner the SP accumulator is energized for resetting in the next cycle. Magnet DD also closes its contacts DD—3 (Fig. 7b) one blade of which is wired to plug socket 709 from which the plug connection 708 is made to the number "3" socket 701 as explained in connection with Fig. 11. At this time upon closure of cam contacts CC—IV, a circuit extends from line 381 through wire 707, contacts BB—4, upper contacts 1—TT—3 and 2—TT—3, lower contacts 3—TT—3 to the number "3" socket 700, then through connection 703b (Fig. 11) to the number "3" socket 701, connection 708 to socket 709, contacts DD—3, CC—IV, multiplicand reset magnet 392MC to line 381. A parallel circuit extends from contacts CC—IV to contacts FC—10, switch 395, MP reset magnet 392MP, switch 396 to line 381. In this manner both the MC and MP reset magnets are energized to effect resetting of these accumulators. At this point in the operation of the machine resetting of the MP, MC, RH and SP accumulators has been initiated and the third product is standing on the LH accumulator.

*Twelfth cycle.*—During this cycle closure of contacts SP—1 (Fig. 7b) will cause energization of relay magnet 3—TT, causing opening of its lower contacts 3—TT—3 so that all the RR and SS magnets are deenergized. The relay magnet JJ is not energized during this punching cycle, inasmuch as contacts 2—TT—5 are open when the contacts RH—4 close and magnet 3—TT has not as yet been energized, so that during the punching operations the contacts JJ1—8 remain in the position shown in Fig. 10 connecting the LHRO device to the punching mechanism. Upon energization of relay magnet B (Fig. 7f) and closure of its contacts B—1 under control of contacts RH—2, the first punching circuit may be completed which is traceable through the now familiar path from line 382 to the common segment 222, through brush 223, to segment 221 of column 27 which is to receive the first digit of the third product, thence through connection 611b (see Fig. 10) to number 3 socket 733, contacts 3—RR—5 which are now closed due to deenergization of the magnet 3—RR, number 3 socket 732, plug connection 612a, 611a, number 2 socket 733, contacts 2—RR—7, number 2 socket 732, connection 612, 611, number 1 socket 733, contacts 1—RR—1, number 1 socket 732, connection 610, to the sixth socket 731, JJ contacts in this position to the appropriate socket 729, connection 606 to the LHRO device. From here the circuit continues through the device in position corresponding to the setting of the readout brush and thence to the appropriate punch selecting magnet 401 to line 381. As before, the remaining columns are punched in succession. As stated, the MC accumulator is reset during this cycle, opening its contacts 274 (Fig. 7f) to break the holding circuit through the relay magnet BB (Fig. 7b) and also the holding circuits for the TT magnets and the magnet L so that these are now deenergized. Closure of the contacts 273MC (Fig. 7f) causes energization of the relay coil C whose contacts C—1 energize the card feed clutch magnet 384 as explained, so that during the next cycle card feeding takes place to traverse the next card past the analyzing brushes and new factors are entered into the MC and MP receiving devices, and repetition of the sequence of operations is repeated to obtain the product of the multiplicand and each of the three multiplier digits on the next card.

*Manual MP setup*

Provision is made for setting up the MP factors by hand and reading only the MC amounts from the card. The device is shown diagrammatically in Fig. 7a and designated MPRO hand setup. It comprises brushes 264 which may be manually adjusted to connect the columns of segments 262 to the common segments 263. The upper ends of the common segments are connected to wires 716 in parallel with the card controlled MPRO device. A switch 602 is provided and when the hand setup is used, the switch is shifted to cause contacts 602a to disconnect the left hand MPRO and connect the right hand MPRO to the cycle controlling circuits. The mechanical arrangement of the hand setup may be similar to that shown in Figs. 5 and 6 of the British Patent No. 428,794.

Rate multiplying

The present machine may be arranged to multiply amounts in each of a group of cards by a common set of rates or multipliers. These common multiplier factors are punched in a special rate card, which rate card is distinctively punched, for example, in the X position, and which card is placed to precede a group of detail cards in a card run. With rate card multiplication, groups of detail cards, each preceded by a rate card, are inserted in the feed magazine and the machine started in the usual manner. Controls are provided so that the multiplier receiving device will be reset each time a new rate card passes through the machine prior to the reading of the multiplier amounts from such rate card into such multiplier receiving device. For rate card multiplication, the switch 391 (Fig. 7a), switches 396 (Fig. 7b) and switch 405 (Fig. 7f) are placed in the reverse position from that shown on the circuit diagram and switch 395 (Fig. 7b) will be left in the position shown in the diagram. When the rate card which is punched in one of the extra index point or X positions, is about to pass the brushes of the machine, the X index point of the card will be in line with the X brush 106 (Fig. 7f) and the hole in the card at the X position will cause establishment of the X brush circuit and energize the relay coil A, the circuit being completed through contacts FC—5 and relay contacts H—2, which are now closed.

A stick circuit for relay coil A is established through the relay contacts A—3 and contacts FC—3 to the other side of the line. The energization of relay coil A (Fig. 7f) shifts relay contacts A—2 (Fig. 7a) and A—1 (Fig. 7b) to reverse position from that shown. The shifting of relay contacts A—2 cuts off the return circuit from the 390MC magnets, but maintains a return circuit to ground from the 390MP magnets. Consequently the amounts of the rates or multipliers may be entered from the rate card, but no entry will be made from the rate card into the multiplicand receiving device. The relay contacts A—1 establish a return circuit for the 392MP reset magnet so that the multiplier accumulator will become reset concurrently with the reset of the multiplicand receiving device at the end of a run of computations on a number of detail cards. Such reset will occur prior to the reading in of the new multiplier into the MP receiving device from the new rate card. With rate card operations, provision is made to eliminate punching an imaginary product on the rate card itself. It will be remembered that the rate card contains multiplier factors only and there is no multiplicand factor on such card. Suppression of punching of an imaginary product on rate card operations is effected in two different ways, one control being provided when the first rate card passes into the machine and a different control being provided when the machine is operating on a run of cards with a rate card intermediate groups of detail cards. The first control condition will first be described.

When the constant multipliers are read in from the first rate card preceding the first group of detail cards the card eject assembly in the punch will be in the position shown in Fig. 5 and contacts P—4 (see also Fig. 7f) will be closed.

Referring to Fig. 7f, contacts 411 are the usual so-called list contacts in the multiplier receiving device and one pair of these contacts is provided for each order and such pair of contacts is arranged to be closed upon the entry of a figure into its corresponding order of the multiplier receiving device. Such contacts 411 may be of the type shown in the Lake Patent No. 1,534,531, dated April 21, 1925 (see contacts 50 in Fig. 2 of that patent). With such a contact arrangement in the multiplier receiving device it will be appreciated that the entry of any significant figure amount into the multiplier receiving device will establish a circuit to relay coil J energizing this coil. The energization of relay coil J will close stick contacts J—1 and establish a stick circuit through contacts P—2 now closed. Upon the energization of J and closure of contacts J—1, a circuit is also established to energize relay coil E through contacts P—4 now closed. The energization of relay coil E will close stick contacts E—2. Relay coil E remains energized as long as J is energized and as long as contacts P—4 are closed. The rate card passes through the card handling section of the machine and into the punch and after being placed in the punch, the punch immediately traverses the rate card to the position at which product punching would normally begin to occur. This traverse of the rate card from R position to the R—1 position is initiated and effected in the manner previously explained for an ordinary multiplier and multiplicand detail card. The traverse of the rate card from the R position to the R—1 position will have brought about an opening of contacts P—5 and such contacts P—5 will open before there is an opening of contacts P—4. The opening of contacts P—5 will deenergize relay coil K which was previously energized in the manner previously described so that relay contacts K—1 assume the position shown in the diagram (Fig. 7f). With relay contacts K—1 in this position a stick circuit is established for relay coil E through contacts E—2 now closed. Accordingly, the arrangement provides for the establishment of a stick circuit for E before contacts P—4 open, such contacts P—4 previously having maintained the energization of relay coil E. Ultimately contacts P—4 become open, such opening being effected upon the complete traverse of rack 181 (Figs. 5 and 5a) to the extreme left hand position. When the rack 181 is in this extreme left hand position, contacts P—2 will open to break the circuit for relay coil J. At such time the 411 list contacts will have reopened because such contacts only close momentarily during the entry of an amount from the rate card.

The energization of relay coil E as above described will have shifted relay contacts E—1 to reverse position from that shown on the diagram. With the constant factor from the rate card entered into the multiplier receiving device but with no amount entered into the multiplicand receiving device the machine will then proceed to attempt to multiply the zero multiplicand amount in the MC receiving device by the constant multiplier amounts. Idle sets of multiplying cycles, one set for each multiplier, will ensue since zeros multiplied by a real number amount gives a result of zero and after these idle cycles are completed there will be an ultimate reset of the MC receiving device. The reset of the MC receiving device will have initiated a new card feeding operation on the first detail card of the following group. Relay coil B becomes successively energized following completion of multiplying of each MP group as previously described. The energization of relay coil B will close relay contacts B—I so that a circuit will be established traced as follows. From the 382 side of the line through B—I now closed, through escapement contacts 215 on the punch, now closed, switch 401 at the 402 position, through contacts 386a, switch 405 in a position reverse from that shown, through contacts E—I now in reverse position from that shown on the circuit diagram, via wire 412 direct to the main punch operating magnet 409 and back to the line 381. With the 409 magnet energized in the manner just described the rate card escapes through the punch without any punching being effected thereon. It will be noted that ordinarily 409 is controlled by the interposer control contacts 408 but under the conditions just described the interposer contacts 408 are shunted out so that no interposers need be thrust forward to effect the energization of 409. As the punch escapes from column to column, escapement contacts 215 open and then reclose to provide the repeated energization of 409 for escaping the rate card through the product punching position in the punch. The rate card ultimately passes through the punch to the eject position and is ejected. Upon completion of the ejection of the rate card there is an initiation of the multiplying operations by the first constant rate multiplier amount derived from the rate card which is now in the MP receiving device, of the multiplicand amount derived from the next detail card and entered into the MC receiving device.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

1. In a multiplying machine, a multiplicand receiving device, means for entering an amount therein, a pair of multiplier receiving devices, means for entering an amount in each, a pair of result accumulating devices, entering means for each, multiplying means including a set of multiplying relays, means controlled jointly by said multiplicand receiving device, one of said multiplier receiving devices and said set of relays for controlling the entering means of one of said result accumulating devices to obtain therein the product of the multiplicand and one of the multipliers, further means controlled jointly by said multiplicand receiving device, the second of said multiplier receiving devices and said set of relays for controlling the entering means of the second of said result accumulating devices to obtain therein the product of the multiplicand and the second multiplier, control means for said two last named means for rendering said two last named means effective in succession whereby the product of the multiplicand and each multiplier will be obtained in said two result accumulating devices in succession, a recording mechanism, means for each of said result accumulating devices for controlling the operation of said recording mechanism in accordance with the results standing in said devices, and further control means coordinated with said first named control means for rendering said recording mechanism controlling means effective to cause recording of the first product while the second product is being obtained and thereafter rendering the second recording mechanism control means effective to cause recording of the second product.

2. In a multiplying machine, a multiplicand receiving device, means for entering an amount therein, a pair of multiplier receiving devices, means for entering an amount in each, a pair of result accumulating devices, entering means for each, multiplying means including a set of multiplying elements, means controlled jointly by said multiplicand receiving device, one of said multiplier receiving devices and said set of elements for controlling the entering means of one of said result accumulating devices to obtain therein the product of the multiplicand and one of the multipliers, further means controlled jointly by said multiplicand receiving device, the second of said multiplier receiving devices and said set of elements for controlling the entering means of the second of said result accumulating devices to obtain therein the product of the multiplicand and the second multiplier, control means for said two last named means for rendering said two last named means effective in succession whereby the product of the multiplicand and each multiplier will be obtained in said two result accumulating devices in succession, a recording mechanism, means for each of said result accumulating devices for controlling the operation of said recording mechanism in accordance with the results standing in said devices, and further control means coordinated with said first named control means for rendering said recording mechanism controlling means effective to cause recording of the first product while the second product is being obtained and thereafter rendering the second recording mechanism control means effective to cause recording of the second product.

3. In a multiplying machine, a multiplicand receiving device, means for entering an amount therein, three multiplier receiving devices, means for entering an amount in each, a pair of result accumulating devices, entering means for each, multiplying means including a set of multiplying relays, a set of circuit connections jointly established by said multiplicand receiving device, one of said multiplier receiving devices and said set of relays for controlling the entering means of one of said result accumulating devices to obtain therein the product of the multiplicand and one of the multipliers, a second set of circuit connections jointly established by said multiplicand receiving device, the second of said multiplier receiving devices and said set of relays for controlling the entering means of the second of said result accumulating devices to obtain therein the product of the multiplicand and the second multiplier, a third set of circuit connections jointly established by said multiplicand receiving device, the third of said multiplier receiving devices and said set of relays for controlling the entering means of the first of said result accumulating devices to obtain therein the product of the multiplicand and the third multiplier and control means for said three last named sets of circuit connections for establishing the same in succession whereby the product of the multiplicand and each multiplier will be obtained in said two result accumulating devices in succession and alternatively.

4. In a multiplying machine, a multiplicand receiving device, means for entering an amount therein, three multiplier receiving devices, means for entering an amount in each, a pair of result accumulating devices, entering means for each, multiplying means including a set of multiplying relays, means controlled jointly by said multiplicand receiving device, the first of said multiplier receiving devices and said set of relays for controlling the entering means of the first of said result accumulating devices to enter therein the product of the multiplicand and the first multiplier, means controlled jointly by said multiplicand receiving device, the second of said multiplier receiving devices and said set of relays for controlling the entering means of the second of said result accumulating devices to enter therein the product of the multiplicand and the second multiplier, means controlled jointly by said multiplicand receiving device, the third of said multiplier receiving devices and said set of relays for controlling the entering means of the first of said result accumulating devices to enter therein the product of the multiplicand and the third multiplier, and control means for said three last named means for rendering the same effective in succession whereby the product of the multiplicand and each multiplier will be entered in succession and alternatively in the pair of result accumulating devices.

5. The invention set forth in claim 4 in which recording mechanism is provided for each of said result accumulating devices, said recording mechanism being arranged for control by the result accumulating devices in accordance with the results standing therein, and further control means coordinated with the first named control means for rendering the result receiving devices effective in alternation to control said recording mechanism, with each result receiving device controlling the recording mechanism while the other result receiving device is coordinated with a subsequent multiplier receiving device to obtain the next product.

6. The invention set forth in claim 4 in which selectively settable devices are provided and settable in accordance with the number of multiplier receiving devices to be rendered effective, said devices being coordinated with said control means to interrupt its operation after a selected number of multiplier receiving devices has been rendered effective.

7. In a multiplying machine, a plurality of denominationally ordered cycle controlling magnets, an entry receiving device having a plurality of denominationally ordered digit receiving sections, a circuit connection between each magnet and the correspondingly ordered section, a pair of normally open contacts included in each connection, an actuating magnet for each pair of contacts, circuit connections for energizing said actuating magnets, selectively settable means included in said circuit connections to cause selective energization of any one or more of said magnets whereby any selected one or more sections will be electrically connected to its correspondingly ordered controlling magnet, a pair of contacts for each magnet, a further magnet, and a circuit connection including said further magnet, completed through only the contacts of the selected cycle controlling magnets when the selected magnets are energized.

8. In a multiplying machine arranged to perform a plurality of multiplying cycles of operation, a multiplier receiving device having a plurality of denominationally ordered sections each settable to represent a digit, a cycle controlling magnet, normally incomplete circuit connections between each of said sections and said magnet, controlling devices operative successively for each multiplying cycle of operations, selectively settable means settable in accordance with the number of multiplying cycles to be performed, and means controlled by said controlling devices through said settable means for completing the connections between each section and said magnet in turn, one connection being completed for each cycle of multiplying operations.

9. In a multiplying machine, a cycle controller having a plurality of ordered sections each including a controlling relay, an entry receiving device having a plurality of like sections at least three in number, means for entering at least three amounts, each into a group comprising one or more of said sections so that the plurality of sections constitutes at least three separate groups with the same or different numbers of denominationally ordered sections in each group, manually settable devices settable in accordance with the number of said groups and the number of sections in each group, a plurality of relays included therein, means controlled by said relays for connecting the ordered sections of all of the denominated groups to correspondingly ordered sections of the cycle controller, and cyclically operating means for rendering said settable devices and connecting means effective to connect each group of sections in turn to the cycle controller.

10. In a multiplying machine having a multiplier receiving device comprising a series of denominationally ordered sections, a cycle controller including a plurality of cycle controlling relay magnets, one for each section of the receiving device, means for causing each relay magnet to be connected for energization under control of its related section, contacts for each relay magnet, a control magnet, a circuit connection completed through all of said contacts when all the relay magnets are energized, and means operative to energize said control magnet through said circuit connection, in combination with adjustable means for controlling said first named means to connect all or any lesser portion of said series of sections to the relay magnets related to the sections in said portion, and a circuit connection for each lesser portion, each established through the contacts of only the said related relay magnets when all are energized, said connections each including said control magnet whereby said control magnet will be energized when all of any selected lesser number of relay magnets is energized.

11. In a multiplying machine having a multiplier receiving device comprising a series of denominationally ordered sections, a cycle controller including a series of cycle controlling relay magnets, one for each section, and connections controlled by said sections for energizing said relay magnets, in combination with selectively settable means for conditioning any number less than all of said sections to cause energization of a like number of said relay magnets through said connections and for conditioning the remainder of said sections to cause energization of a number of relay magnets equal in number to the remaining sections through said connections, one of said number of relay magnets including the other number of relay magnets, means including cyclically operable devices for rendering each number of sections effective in turn to energize the related number of relay magnets through the said connections, a pair of contacts for each relay magnet, a series circuit connection established through the contacts of one of said number of magnets, a second series circuit connection established through the contacts of the other number of magnets, a single control magnet arranged in both of said series connections, and means for completing said connections whereby, when the first number of relay magnets is energized, the control magnet will be energized through one series connection and when the second number of relay magnets is energized, the control magnet will be energized through the other series connection.

12. In a multiplying machine having at least three entry receiving devices each comprising one or more denominational sections, means for entering a digit or a multidenominational amount in each of said devices according to the number of sections thereof, a cycle controller having at least three denominationally ordered relay magnets, circuit connections intermediate said sections and said relay magnets and a pair of contacts for each relay magnet, in combination with means for adjusting said connections to cause each entry receiving device to be connected to the relay magnets with the denominationally ordered sections connected to the correspondingly ordered relay magnets, means for causing said adjusting means to adjust the connections for the several devices in turn, a control magnet, further adjusting means coordinated with the first named adjusting means and operative separately for each device when the device is connected to the appropriate number of relay magnets for including said control magnet in a circuit extending serially through only the contacts of the number of relay magnets related to the connected device.

ARTHUR H. DICKINSON.